Nov. 22, 1955 F. W. OLSON ET AL Re. 24,095

APPARATUS TO PACK OLIVES AND THE LIKE

Original Filed Oct. 7, 1948 15 Sheets-Sheet 1

INVENTORS.
F. WILLIAM OLSON
EUGENE F. BAERENRODT
BY Robert S. Duncan
ATTORNEY.

APPARATUS TO PACK OLIVES AND THE LIKE

Original Filed Oct. 7, 1948 15 Sheets-Sheet 2

*INVENTORS.*
F. WILLIAM OLSON
EUGENE F. BAERENRODT
BY Robert S. Dunlap
ATTORNEY.

APPARATUS TO PACK OLIVES AND THE LIKE

Original Filed Oct. 7, 1948 15 Sheets-Sheet 3

*INVENTORS.*
F. WILLIAM OLSON
EUGENE F. BAERENRODT
BY Robert S. Duncan
ATTORNEY.

APPARATUS TO PACK OLIVES AND THE LIKE

Original Filed Oct. 7. 1948 15 Sheets-Sheet 4

INVENTORS.
F. WILLIAM OLSON
EUGENE F. BAERENRODT
BY Robert S. Dunham
ATTORNEY.

APPARATUS TO PACK OLIVES AND THE LIKE

Original Filed Oct. 7, 1948 15 Sheets-Sheet 5

INVENTORS.
F. WILLIAM OLSON
EUGENE F. BAERENRODT
BY Robert S. Dunham
ATTORNEY.

APPARATUS TO PACK OLIVES AND THE LIKE

Original Filed Oct. 7, 1948 15 Sheets-Sheet 6

INVENTORS.
F. WILLIAM OLSON
EUGENE F. BAERENRODT
BY Robert S. Dunham
ATTORNEY.

APPARATUS TO PACK OLIVES AND THE LIKE

Original Filed Oct. 7, 1948 15 Sheets-Sheet 7

*INVENTORS.*
F. WILLIAM OLSON
EUGENE F. BAERENRODT
BY Robert S. Dunlap
ATTORNEY.

APPARATUS TO PACK OLIVES AND THE LIKE

Original Filed Oct. 7, 1948 15 Sheets-Sheet 8

INVENTORS.
F. WILLIAM OLSON
EUGENE F. BAERENRODT
BY Robert S. Dunham
ATTORNEY.

INVENTORS.
F. WILLIAM OLSON
EUGENE F. BAERENRODT
BY Robert S. Dunham
ATTORNEY.

APPARATUS TO PACK OLIVES AND THE LIKE

Original Filed Oct. 7, 1948 15 Sheets-Sheet 10

INVENTORS.
F. WILLIAM OLSON
EUGENE F. BAERENRODT
BY Robert S. Dunham
ATTORNEY.

APPARATUS TO PACK OLIVES AND THE LIKE

Original Filed Oct. 7, 1948 15 Sheets-Sheet 11

INVENTORS.
F. WILLIAM OLSON
EUGENE F. BAERENRODT
BY Robert S. Duncan
ATTORNEY.

APPARATUS TO PACK OLIVES AND THE LIKE

Original Filed Oct. 7, 1948 15 Sheets-Sheet 12

INVENTORS.
F. WILLIAM OLSON
EUGENE F. BAERENRODT
BY Robert S. Durham
ATTORNEY.

APPARATUS TO PACK OLIVES AND THE LIKE
Original Filed Oct. 7, 1948 15 Sheets-Sheet 13
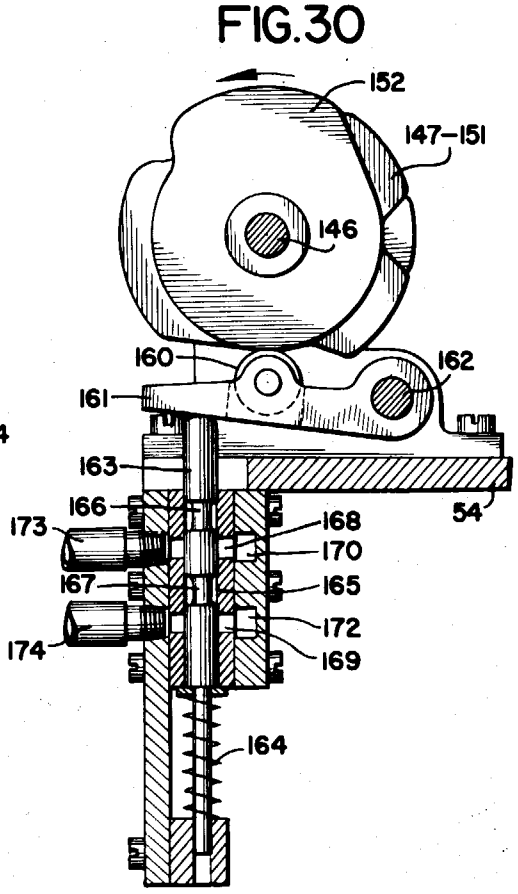
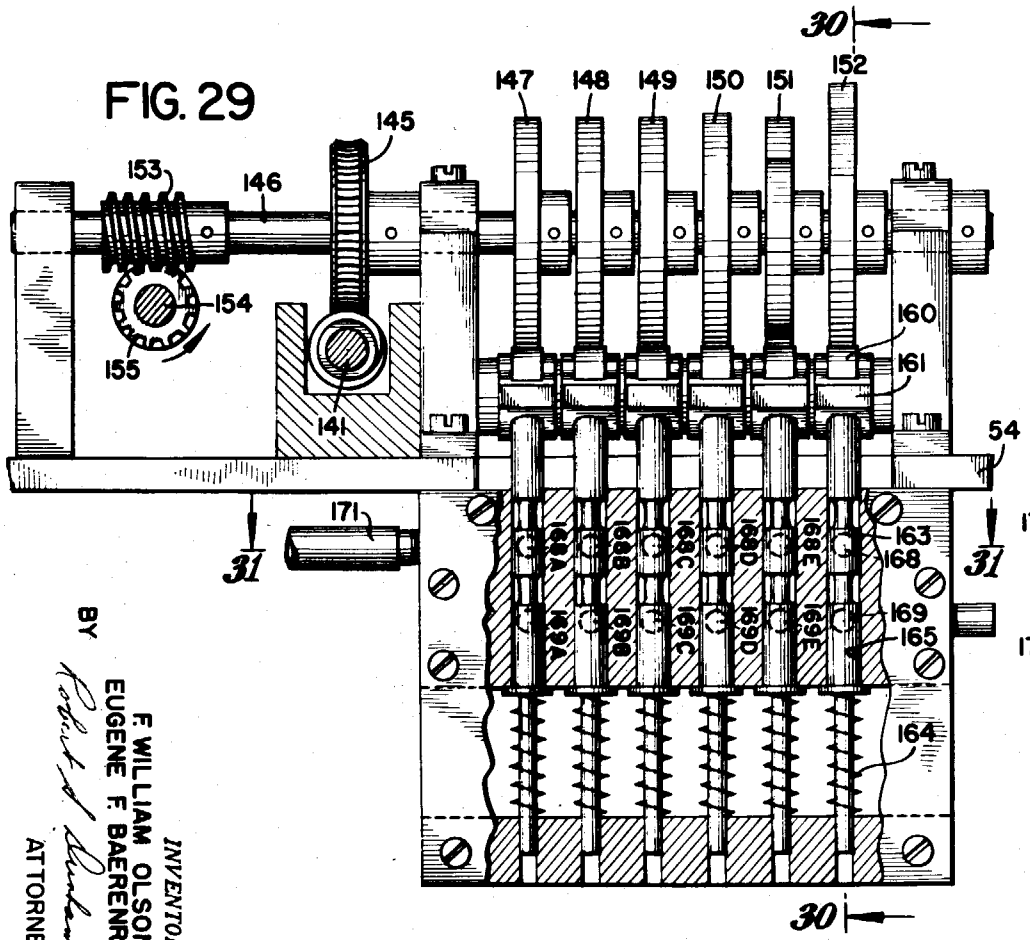
INVENTORS.
F. WILLIAM OLSON
EUGENE F. BAERENRODT
BY Robert S. Dunham
ATTORNEY.

INVENTORS.
F. WILLIAM OLSON
EUGENE F. BAERENRODT
BY Robert S. Dunham
ATTORNEY.

APPARATUS TO PACK OLIVES AND THE LIKE

Original Filed Oct. 7, 1948 15 Sheets-Sheet 15

INVENTORS.
F. WILLIAM OLSON
EUGENE F. BAERENRODT
BY Robert S. Dunham
ATTORNEY.

United States Patent Office

Re. 24,095
Reissued Nov. 22, 1955

24,095

APPARATUS TO PACK OLIVES AND THE LIKE

Frank William Olson, Montclair, and Eugene F. Baerenrodt, Essex Fells, N. J.

Original No. 2,693,901, dated November 9, 1954, Serial No. 53,264, October 7, 1948. Application for reissue May 31, 1955, Serial No. 512,356

27 Claims. (Cl. 226—14)

Matter enclosed in heavy brackets [ ] appears in the original patent but forms no part of this reissue specification; matter printed in italics indicates the additions made by reissue.

This invention relates to an automatic packing or filling machine, and more particularly to a machine for packing olives or like articles, such as cherries or onions, in transparent cylindrical containers.

In the packaging of fancy goods, such as olives, cherries, onions and the like, the trade demands that the individual items be packed in a regular and systematic array.

The trade demands that olives be packed in cylindrical transparent containers, such as glass jars, the individual olives being carefully positioned in successive layers of two or more, each successive layer being rotatably displaced a prescribed amount from the layers immediately above and below. The total number of olives to be packed in a single container of course is determined by the size of the container to be utilized and the positional relationship of the olives therein. The olives may be packed in layers of two, three, four or more, if desired, and the number of olives in each layer determines the required amount of rotational disposition necessary to meet the demands of the trade. Similar requirements exist for the packing of cherries, onions and other like articles. A primary object of this invention is, therefore, to provide an essentially simple and efficient machine to pack olives in the above described manner, as prescribed by the trade.

At the present day the packing of fancy goods, namely olives and the like, is done entirely by manual operations. The olives are imported into this country in barrels, usually graded and sorted, both as to size and condition, and then manually packed in suitable containers in the alignment set forth above, a tedious, time consuming and expensive procedure at best.

A further object of this invention is, therefore, to provide an essentially simple, efficient, inexpensive and completely antomatic device to pack olives at a rate not attainable through manual operation.

The manual packing of olives, at the present day, necessitates human contact with the articles of food, necessarily resulting in a lowering of sanitary standards, which is always undesirable in food handling. A further object of this invention, therefore, is to provide a completely automatic device for packing olives or like articles with a minimum of human contact with the articles of food, and to provide for easy removal and cleaning of all parts of the device contacting the food to insure the maintenance of a high standard of sanitary conditions.

While the device was especially designed for packing olives in the special alignment described above, e. g. the olives carefully positioned in successive layers of two or more, each successive layer being rotatably displaced a prescribed amount from the layers immediately above and below, it may be used for the packing of other similar materials whose packing requires an alignment similar to that set forth above.

To these and other ends, the presently preferred forms of the device embodying the invention are shown, by way of example, in the accompanying drawings.

Referring to the drawings:

Fig. 29 is a side view of the control and timing system on the line 29—29 of Fig. 2;

Fig. 30 is a vertical section on the line 30—30 of Fig. 29;

Figure 1:
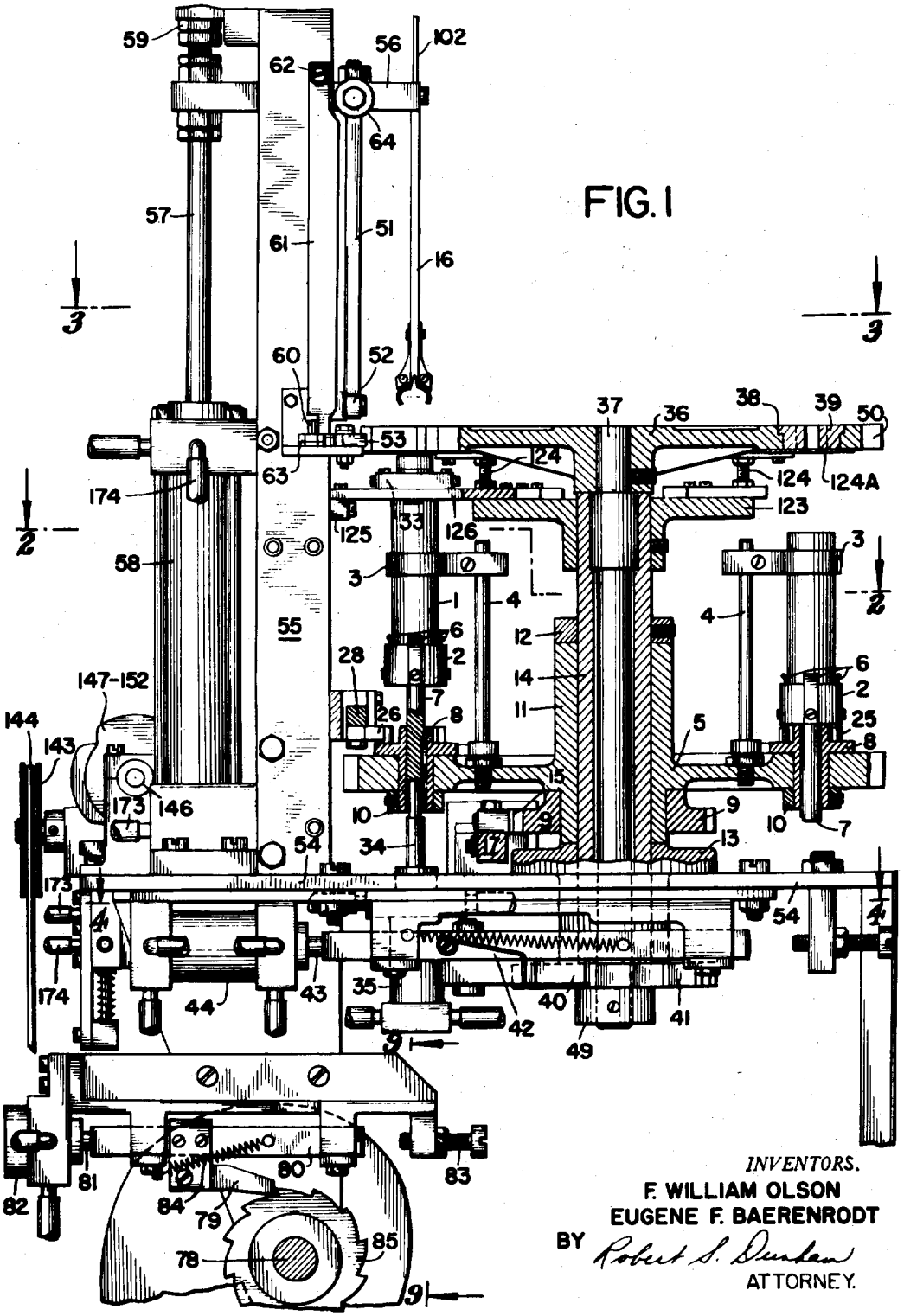
Fig. 1 is a fragmentary side view of the device.

The invention may be briefly described as an integral combination of a container positioning system, an olive positioning system, a mechanism for depositing the olives in the container in the desired relationship, and means to control and integrate the movements of the above mentioned elements. For the purposes of simplicity only, the embodiment of the invention illustrated in the drawings is designed to pack olives in layers of two with each layer being rotatably displaced a quarter circle or 90° from each successive layer with a total of thirteen layers of olives required to be deposited in each container.

It is essential for efficient operation that the containers and the olives be at the right place at the precise instant of time in order that the olives be packed by the olive depositing mechanism in the containers in the prescribed manner.

The container positioning mechanism consists generally of a turntable upon which is mounted the containers to be filled, and associated means for placing the containers in the proper position at the proper time to receive the olives. The olive location mechanism consists generally of a second turntable upon which are disposed the olives, in suitable holders, at the proper position and at the proper time, to facilitate their insertion into the container. The mechanism for depositing the olives in the container consists generally of a reciprocating arm having, at one end, suitable means for grasping the olives, and associated means for controlling the grasping and releasing of the olives at the proper location and at the proper time. The motive power for the machine illustrated in the drawings is compressed air actuating pistons through a system of cylinders and the timing of the various movements is controlled by a system of cam operated valves regulating the application of air pressure to the respective cylinders, the drive for said cams being a small electric motor.

The above named components will be separately described in detail.

THE CONTAINER POSITIONING SYSTEM

There will first be considered the means adapted to place the containers in the proper position for filling and at the proper instant of time to receive the olives in the desired alignment.

The container positioning mechanism consists generally of a turntable, upon which are mounted the containers in a prescribed relationship, associated means for rotating said turntable, associated means for fixing the position of the container at the dwell point beneath the filling means and means for revolving said container at the dwell point to facilitate the packing of the olives in the manner prescribed by the trade.

Figure 2:
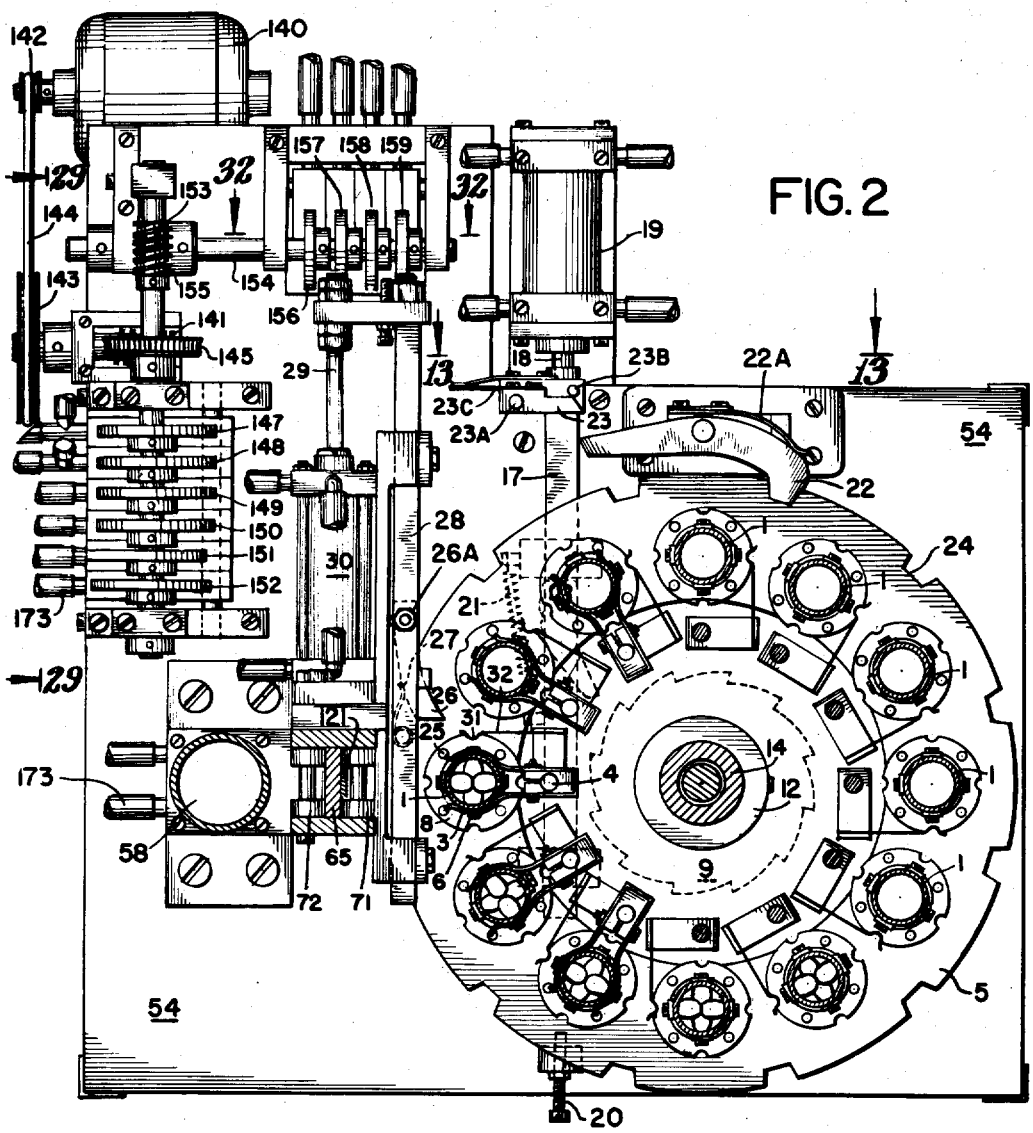
Fig. 2 is a horizontal section on the line 2—2 of Fig. 1, showing the container positioning system and the control system.

In Figs. 1 and 2 the preferred form of the container positioning and location mechanism is shown in detail. The containers 1, of which there are twelve in number equally spaced (i. e. 30° apart) near the periphery of the lower turntable 5, are positioned in sockets 2 and secured against movement with respect to said sockets 2 by spring clamps 3 mounted on vertical supporting rods 4 firmly fastened to the lower turntable 5, and by spring members 6 secured to the sockets 2. The sockets 2 are mounted on cylindrical keyed shafts 7 movably inserted into flanged keywayed bushings 8, the flanged bushings 8 being secured against vertical movement by collars 10 located on the underside of the lower turntable 5.

The lower turntable 5 is rotatably mounted on a non-rotatable hollow shaft 14 by a hub 11 positioned by a collar 12 and a stationary flanged base 13 resting on the bed 54 of the machine, and its rotation is accomplished by the action of a pawl 15 upon a twelve-toothed ratchet 9 secured to the underside of said turntable 5.

In operation it is necessary to place the container to be filled at the dwell point or loading locality directly under the reciprocating arm 16 of the olive depositing mechanism. To accomplish this result the turntable 5 is rotatable by the action of the pawl 15 upon the twelve-toothed ratchet 9, said pawl 15 being mounted on a reciprocating arm 17, which is actuated by a piston rod 18 operating in a cylinder 19 and actuated in both directions by compressed air. The movement of the reciprocating arm 17 is limited by an adustable limiting bolt 20, and returnable to its normal position after actuation, and after the piston rod 18 has returned to its withdrawn position, by the return spring 21. To locate the container 1 carefully in the desired position and to prevent movement of the turntable 5 during the filling operation, there is provided a spring tensioned dog 22 (see also Fig. 13) mounted on the bed 54 of the machine and actuated (for release of the turntable) by a spring tensioned, pivoted pawl 23 mounted on the reciprocating arm 17, the dog 22 engaging suitably located notches 24 embedded on the periphery of the lower turntable 5 while the turntable 5 is stationary (i. e. not being rotated to present an empty container to the position at the dwell point directly beneath the reciprocating arm 16 of the olive depositing mechanism), but adapted to release the turntable 5 when it is being rotated by the action of the pawl 15 upon the ratchet 9.

To provide for the disposing of the olives in the container in successive layers, each layer displaced 90° or a quarter circle from the layers immediately above and below, provision has been made for rotating the container being filled through a 90° arc between the deposition of each layer of olives. Each flanged keywayed bushing 8 mounted on the lower turntable 5 has, on its upper flanged surface, mounted thereon four vertical pins 25 spaced 90° apart. At the position of the container being filled, a pawl 26, tensioned by a spring 27 and mounted, with the spring, on a reciprocating arm 28, which is driven by a piston 29 that operates in a cylinder 30 and is actuated in both directions by compressed air, engages one of the pins 25 on each return stroke of the piston 29 and rotates the [weywayed] *keywayed* flanged bushing 8 together with the keyed shaft 7, the socket 2 and the container 1 through a quarter circle or 90° arc. To position the container 1 carefully, and to hold it releasably in place, the flanged bushing 8 is notched at 31 on the sides of the flanged portions thereof, said notches 31 being engageable by a spring member 32.

Referring now solely to Fig. 1, when the container to be filled reaches its proper location at the dwell point or loading locality directly beneath the reciprocating arm 16 to the olive depositing mechanism, the container 1 is elevated to contact a guiding means 33 above the loading locality by the action of an upright piston 34, operating in a cylinder 35 and actuated in both directions by compressed air, upon the end of the keyed shaft 7 in the flanged keywayed bushing 8. The container 1 is held in contact with the guiding means 33, until the container 1 is filled, by the action of the piston 34.

In the presently preferred form of the invention as shown in the drawings twelve containers have been mounted on the lower turntable 5. The turntable 5 rotates, as a unit, intermittently, presenting a new container 1 at the dwell or filling point only when the previous container has been filled, an operation requiring, in the embodiment illustrated in the drawings, the depositing of thirteen layers of olives, which, in turn, requires thirteen complete strokes of the reciprocating arm 16 of the olive depositing mechanism, one layer of olives being deposited on each complete stroke of the reciprocating arm 16. The container being filled is kept in the elevated position against the guiding means 33 during the entire filling operation requiring thirteen complete strokes of the reciprocating arm 16 of the olive depositing mechanism, and is rotated through 90° for each of the above mentioned strokes of said reciprocating arm 16.

Figure 13:
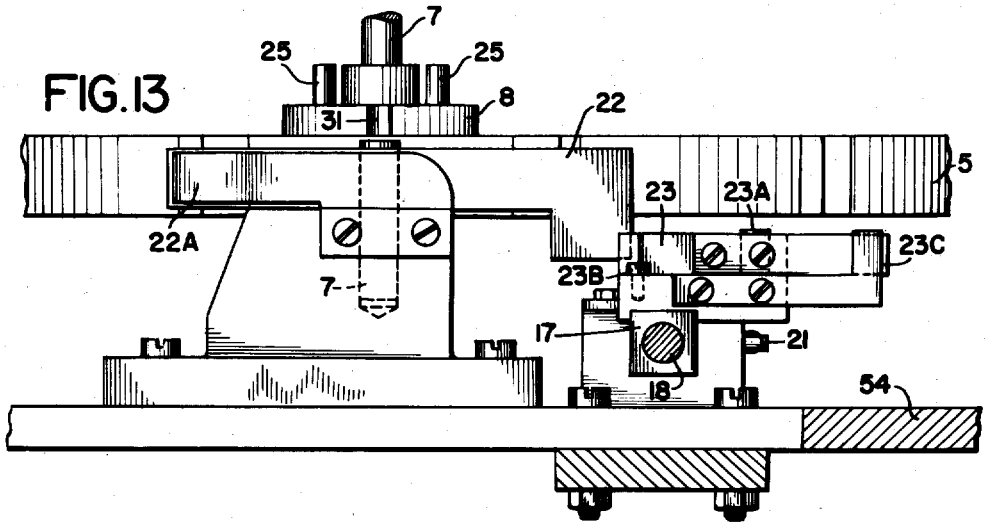
Fig. 13 is a fragmentary expanded vertical section on the line 13—13 of Fig. 2.
Figure 14:
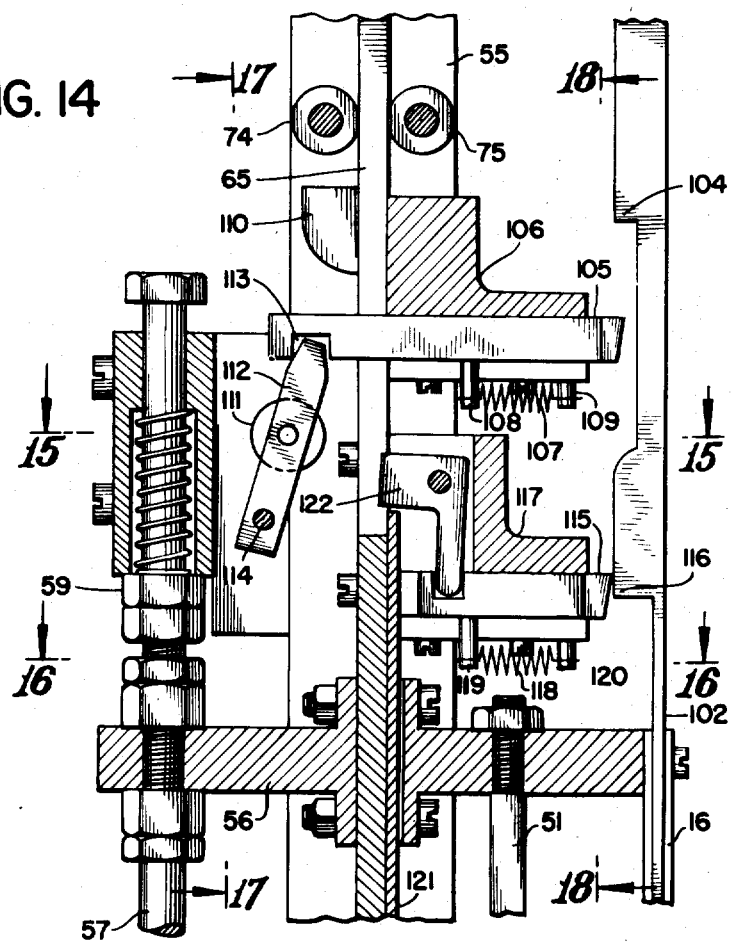
Fig. 14 is an expanded side view of part of the olive depositing means shown in Fig. 5.
Figure 15:
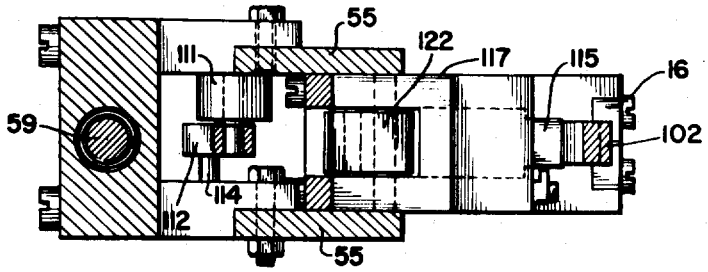
Fig. 15 is a horizontal section on the line 15—15 of Fig. 14.

When the machine is being operated, the following sequence of movements takes place. Assume the machine is in operation and that the uppermost layer of olives has just been deposited in the container at the dwell point. As the reciprocating arm 16 is drawn upward the piston rod 34 is withdrawn by the application of compressed air to the cylinder 35. The withdrawal of the piston rod 34 from contact with the keyed cylindrical shaft 7 causes the shaft 7 together with the socket 2 and the container 1 to fall, i. e. under their own weight (but upon the descending piston rod), from the elevated position as illustrated in Fig. 1. Referring to Figs. 2 and 13 when the socket 2 reaches its normal position, i. e. resting on the flanged keywayed bushing 8, compressed air is introduced into cylinder 19 which causes the piston rod 18 to actuate the reciprocating arm 17.

As the reciprocating arm 17 moves the spring tensioned, pivoted pawl 23, limited in its movement by the pin 23B, contacts the spring tensioned dog 22 and causes the dog 22 to move out of contact with the notch 24. While the dog 22 is out of contact with a notch 24, the pawl 15 mounted on the still moving reciprocating arm 17 engages the ratchet 9 and causes the turntable 5 to rotate. The dog 22 is adapted to be held by the spring tensioned, pivoted pawl 23 in the non-engaged position for a sufficient period of time to permit the action of the pawl 15 upon the ratchet 9 to rotate the turntable through an arc sufficient to move the recently engaged notch 24 out of possible contact with the dog 22 when the same is released and is forced back in contact with the turntable 5 by the tension of the spring 22A. When so released the dog 22 will contact the unnotched portion of the periphery of the turntable 5 and will ride thereon until the turntable 5 is rotated through an arc sufficient to bring the next and successive notch 24 into engagement with the dog 22, thus fixing and holding the location of the next successive container 1 accurately at the dwell point beneath the reciprocating arm 16 of the olive depositing mechanism.

After the above described rotation has been accomplished, compressed air is introduced into the opposite end of the cylinder 19 causing the piston rod 18 to move back to its starting (i. e. receded) position. As the pressure of the piston rod 18 is removed, the return spring 21 moves the reciprocating arm 17 back into its normal position against the piston rod 18. During the backward movement of the reciprocating arm 17 the pawl 23 contacts the dog 22, but does not cause the dog 22 to move, as the pawl 23 is adapted to pivot about the pivot point 23A and is returned to its normal operating position, after passage of the dog 22, by the spring 23C.

When the next successive empty container 1 has been located in the dwell point, through the action described above, the piston rod 34, actuated by compressed air applied to the cylinder 35 contacts the cylindrical keyed shaft 7 and raises the shaft 7, together with the socket 2 and the empty container 1, into firm contact with the guiding means 33 and secures it in this position until the container 1 is entirely filled.

After the container 1 has been raised into contact with the guiding means 33, the reciprocating arm 16 moves downward and deposits the first layer of olives in the bottom of the container 1 and then moves upward. When the reciprocating arm 16 clears the container, compressed air is applied to the cylinder 30 which causes the piston rod 29 to move from its normal extended position (as shown in Fig. 2) into the cylinder 29, thus moving the reciprocating arm 28 in the same direction. The spring tensioned, pivoted pawl 26 mounted on the reciprocating arm 28 contacts a pin 25 on the keywayed flanged collar 8 causing the collar 8, together with the keyed shaft 7, the socket 2 and the container 1, to rotate through a quarter circle. On the return stroke of the arm 28, caused by the application of compressed air to the other end of the cylinder 30 thus moving the piston rod 29, the pawl 26 will be idly deflected by the next pin 25 (i. e. that pin 25 that will be engaged on the next drive stroke) and caused to pivot about the pivot point 26A, the pawl being returnable, after passage, to its normal position by the action of the spring 27. Thus the container 1 at the dwell point has been rotated 90° from its previous position and is now adapted to receive the next [sucecssive] *successive* layer of olives. The above described sequence of operations to rotate the container 1 for each reciprocation, and to effect the consequent depositing of a layer of olives, occurs on each successive reciprocation of the reciprocating arm 16. When the container 1 at the dwell point is filled the entire sequence of operations described above repeats itself, for the filling of the next container.

In the form of the invention illustrated in the drawings, it is necessary to manually remove the filled containers 1 from their sockets 2 and replace them with empty containers 1.

THE OLIVE LOCATION SYSTEM

There will next be described the means provided for locating the olives at the dwell point or loading locality immediately above the container to be filled and in the proper position to be deposited in the container by the reciprocating arm 16 of the olive depositing mechanism.

Figure 3:
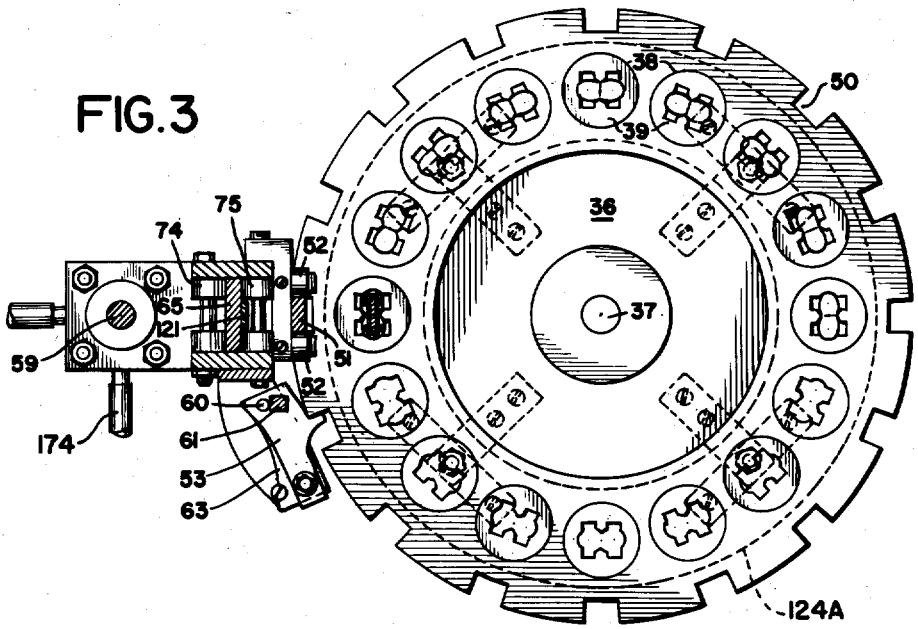
Fig. 3 is a horizontal section on the line 3—3 of Fig. 1, showing the olive location system.

In Figs. 1 and 3 the presently preferred form of the olive location mechanism is illustrated in detail. It is necessary to place the olives above the container to be filled at the proper time to be grasped by the olive disposing mechanism. To accomplish this end there is provided an upper turntable 36, secured to a rotatable shaft 37 contained within the aforementioned hollow cylindrical shaft 14, the shaft 37 being secured by a collar 49 located at its nether extremity. Uniformly spaced (i. e. spaced 22½° apart) near the periphery of the upper turntable 36 are a plurality of annular receptacles 38 (e. g. these annular receptacles 38 are sixteen in number in the preferred form as shown in the figure, but the actual number of receptacles 38 on said upper turntable is not critical) adapted to receive the olive holders 39. The olive holders 39 are suitable cylindrical castings adapted to receive and contain two olives inserted therein with their longer axes in the same line, and disposed to permit the passage of the reciprocating arm 16 of the olive depositing mechanism.

As will be seen from Figs. 1, 3, 22 and 24–26, each holder 39 has two olive-receiving apertures which open partially into each other and which are shaped to engage and support the olives at peripheral regions near both ends of each olive. The surfaces which engage each olive are spaced across the olive, by a distance slightly less than the corresponding dimension of the uncompressed olive, so that the olive will be held against falling of its own weight, but may be readily pushed through by the olive depositor which is described below. The apertures in the holder are also widened, adjacent the central region of the olive, to provide clearance for the olive-gripping parts of the depositor.

Figure 4:
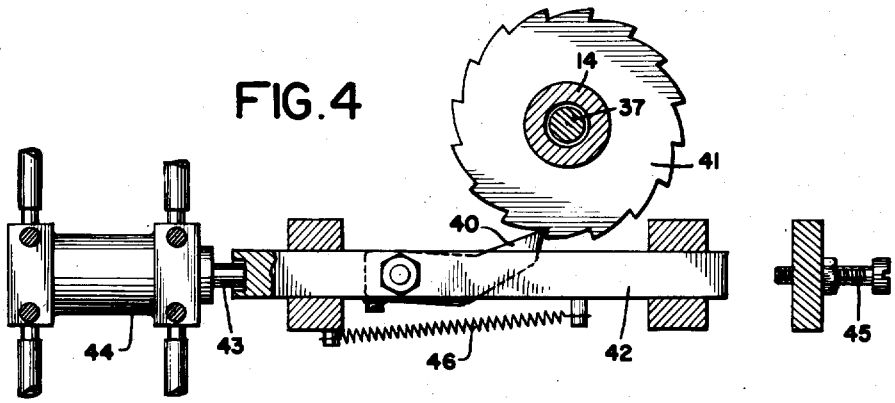
Fig. 4 is a horizontal section on the line 4—4 of Fig. 1, showing the driving means for the olive location system.

Referring now to Figs. 1 and 4, the upper turntable 36 is rotated by the action of a spring tensioned pawl 40 upon a ratchet 41 (said ratchet 41 must have the same number of teeth as there are olive holders 39, e. g. therefore said ratchet 9 has 16 teeth in the embodiment shown in Fig. 4) secured to the shaft 37 directly above the aforementioned collar 49. The pawl 40 is mounted on a reciprocating arm 42 actuated by a piston 43 operating in a cylinder 44 and actuated in both directions by compressed air; the reciprocating arm 42 is limited in its movement by an adjustable limiting bolt 45 and is returnable to its normal position after actuation by the return spring 46.

Referring now to Figs. 1 and 3, the olive holders 39 must be positioned directly beneath the reciprocating arm 16 of the olive depositing mechanism. To accomplish this end there are provided a plurality of notches 50 on the periphery of the upper turntable 36 corresponding in number to the number of olive holders 39, and so positioned as to correctly align the olive holders 39 when a reciprocating guide bar 51, moving in conjunction with the reciprocating arm 16 of the olive depositing mechanism, moving between the guide rollers 52 engages the notch 50 corresponding to the olive holder 39 above the container 1 which is actually being filled.

Figure 17:
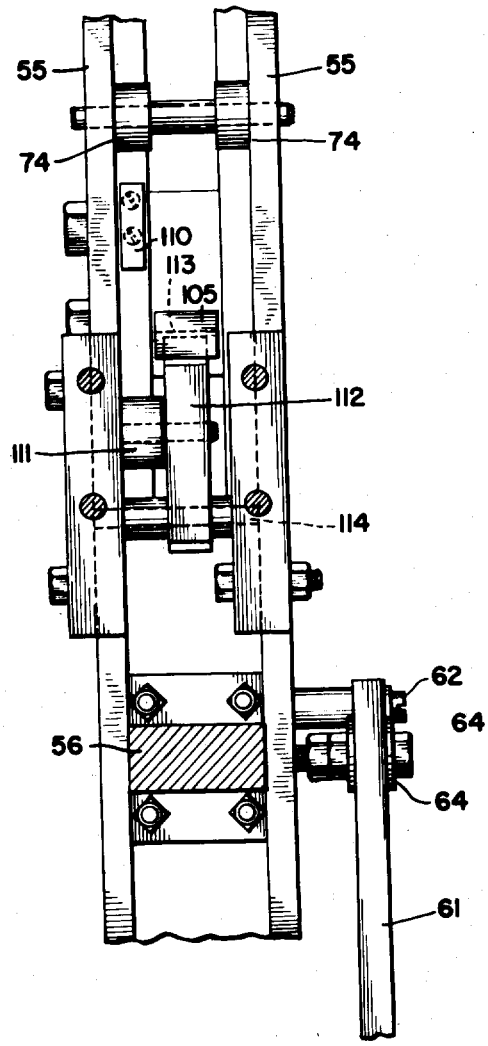
Fig. 17 is a fragmentary vertical section on the line 17—17 of Fig. 14.
Figure 18:
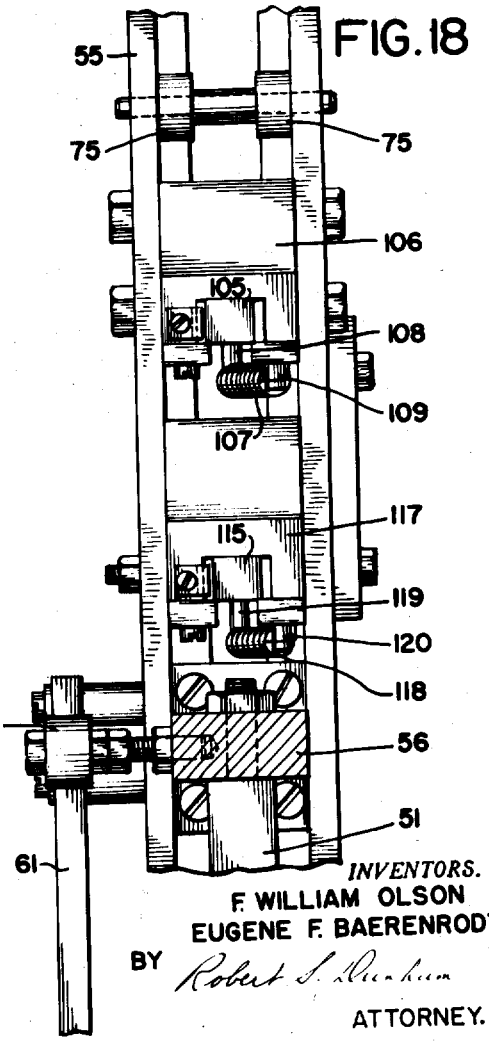
Fig. 18 is a fragmentary vertical section on the line 18—18 of Fig. 14.

To prevent the turntable 36 from rotating past the next successive olive holder 39, a spring tensioned dog 53 is mounted to engage the next [succeesive] *successive* notch 50, adjacent to the aforesaid notch 50 at the dwell point, on the periphery of the turntable 36. The dog 53 has mounted upon its upper surface a vertical pin 60 engageable by a bar 61 pivoted at 62 on the frame 55. When the movable cross-arm 56 of the olive depositing mechanism is in its uppermost position, the spring 63 on the dog 53 will hold said dog in close proximity with the periphery of the upper turntable 36 and will engage the next successive notch 50. As the cross-arm 56 moves down the extended roller 64 (see also Figs. 16–18) will contact the surface of the bar 61 and move the dog 53 out of the engaged position and into a position permitting rotation of the turntable 36. While the cross-arm 56 is in its downward position the guide bar 51, in engaging the notch 50 at the dwell point, will prevent any movement of the turntable 36. The guide bar 51 is of such a length that upon its upward stroke it is fully withdrawn from the notch 50 before the extended roller 64 completes its withdrawal from effective contact with the pivoted bar 61. As a result the pawl 40 is permitted to engage the ratchet 41 and move the turntable 36 a certain amount, in the period of time available after the disengagement of the guide bar 51 and before the disengagement of the extended roller 64 with the pivoted bar 61. Specifically, such amount of motion of the turntable occurring while the dog 53 is still held in retracted position by the bar 61 is sufficient to permit the previously engaged notch 50 to move past the effective point of contact of the dog 53. Continuing upward movement of the cross-arm 56 then serves to remove the pressure of the bar 61 upon the pin 60, previously caused by the contact of the bar 61 and the extended roller 64 carried by the cross-arm. In consequence, under the pressure of the spring 63, the dog 53 engages the periphery and eventually the next successive notch 50 of the turntable 36, thus preventing rotation past the next successive olive holder 39.

Thus the action of the dog 53 permits the rotation of the turntable 36 of an amount equivalent to placing the next olive holder 39 beneath the reciprocating arm 16 of the olive depositing mechanism, on each stroke of the reciprocating arm 16.

While supplemental handling or conveying systems may be employed if desired, the illustrated apparatus is conveniently put in use by inserting the olives manually in the several holders 39, and thereafter keeping the holders filled by like manual replacement of olives in the empty holders as the latter leave the depositing mechanism. The holders, which can be removed when necessary for cleaning, realignment or replacement, are easily pre-set in correct alignment for the depositing mechanism, so that the olive-receiving recesses are properly pre-positioned and the necessary alignment of the olives themselves is thus obtained, without special care on the part of the operator, by the simple act of placing the olives in the holes.

THE OLIVE DEPOSITOR

There will next be described the means provided for transferring the olives from the olive holding mechanism to the container.

Figs. 5, 6, 7 and 8 show in detail the complete olive depositing mechanism in various stages of operation. In general the olive depositing mechanism performs three cooperating functions. First, it must deposit the olives at the required level in the container. Secondly, it must securely grasp the olives in the olive holders 39. Thirdly, it must release the olives at the proper instant of time in the container 1.

In Figs. 1, 5, 6, 7 and 8 the preferred form of the device adapted to place the olives in the containers at the desired level is shown in detail.

The olive depositing mechanism is mounted on a frame 55, made up of two spaced, parallel, rectangular bars of metal, supported by the bed 54 of the machine. A reciprocating arm 16 and a guide bar 51 are secured to a cross-arm 56 which is, in turn, secured to a piston 57 operating in a cylinder 58 and actuated in both directions by compressed air. The movement of the piston 57 is limited by an adjustable spring tensioned, limiting bolt 59. The operation of the piston 57, transmitted through the cross-arm 56, moves the reciprocating arm 16 of the olive depositing mechanism in the vertical direction.

Figure 7:
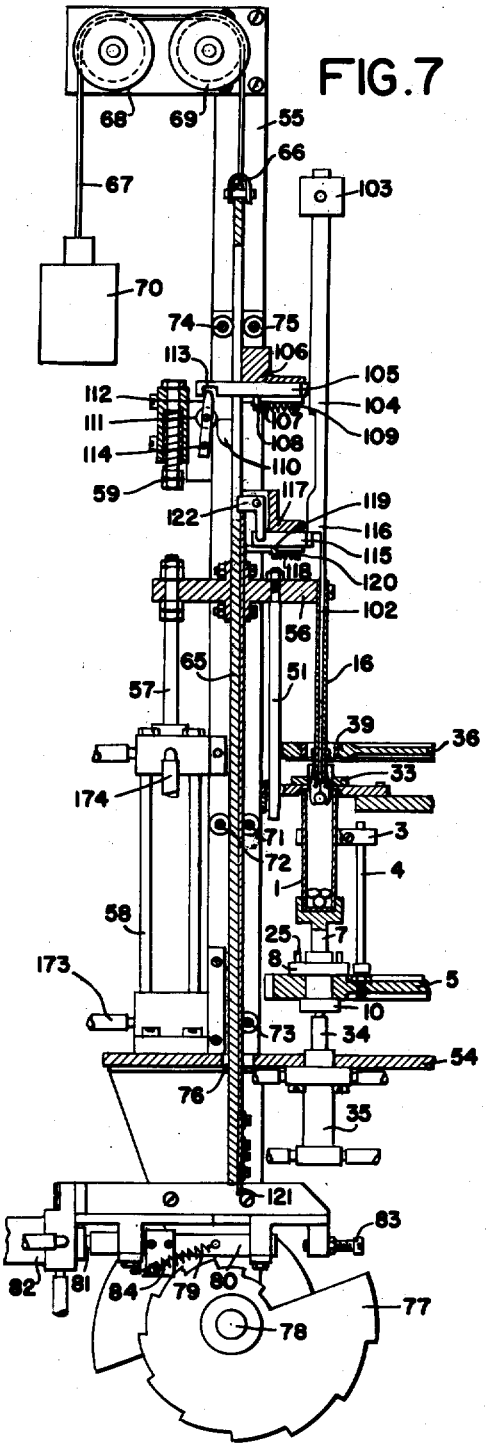
Fig. 7 is a fragmentary side sectional view of the device, showing the olive depositing system at a further intermediate position on its stroke.
Figure 8:
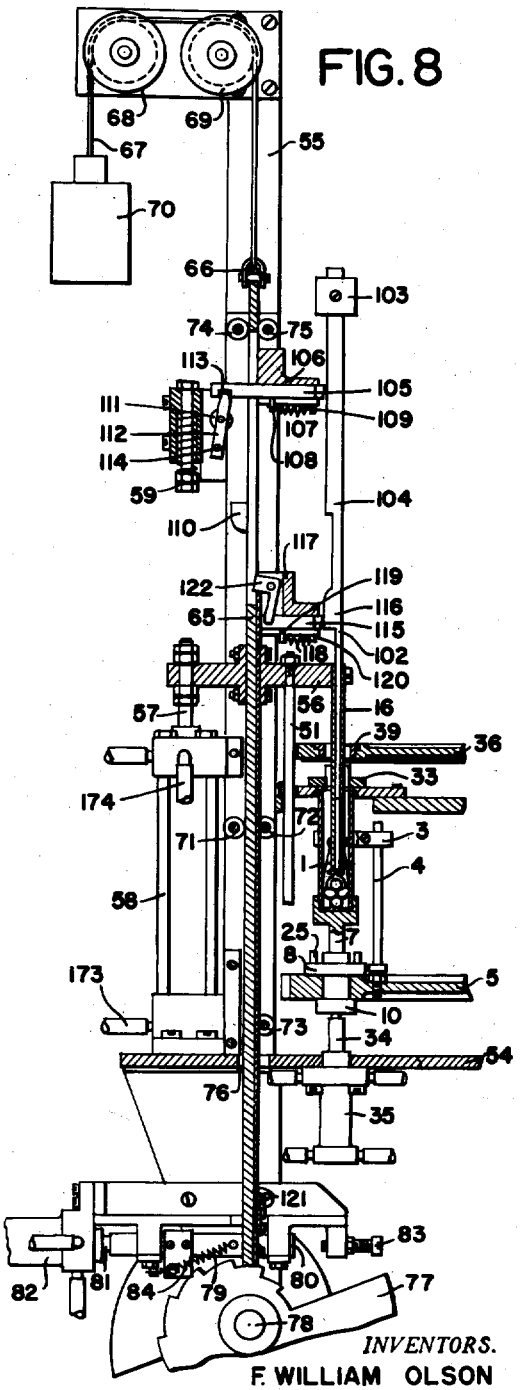
Fig. 8 is a fragmentary side sectional view of the device, showing the olive depositing system at the lower portion of its stroke.
Figure 9:
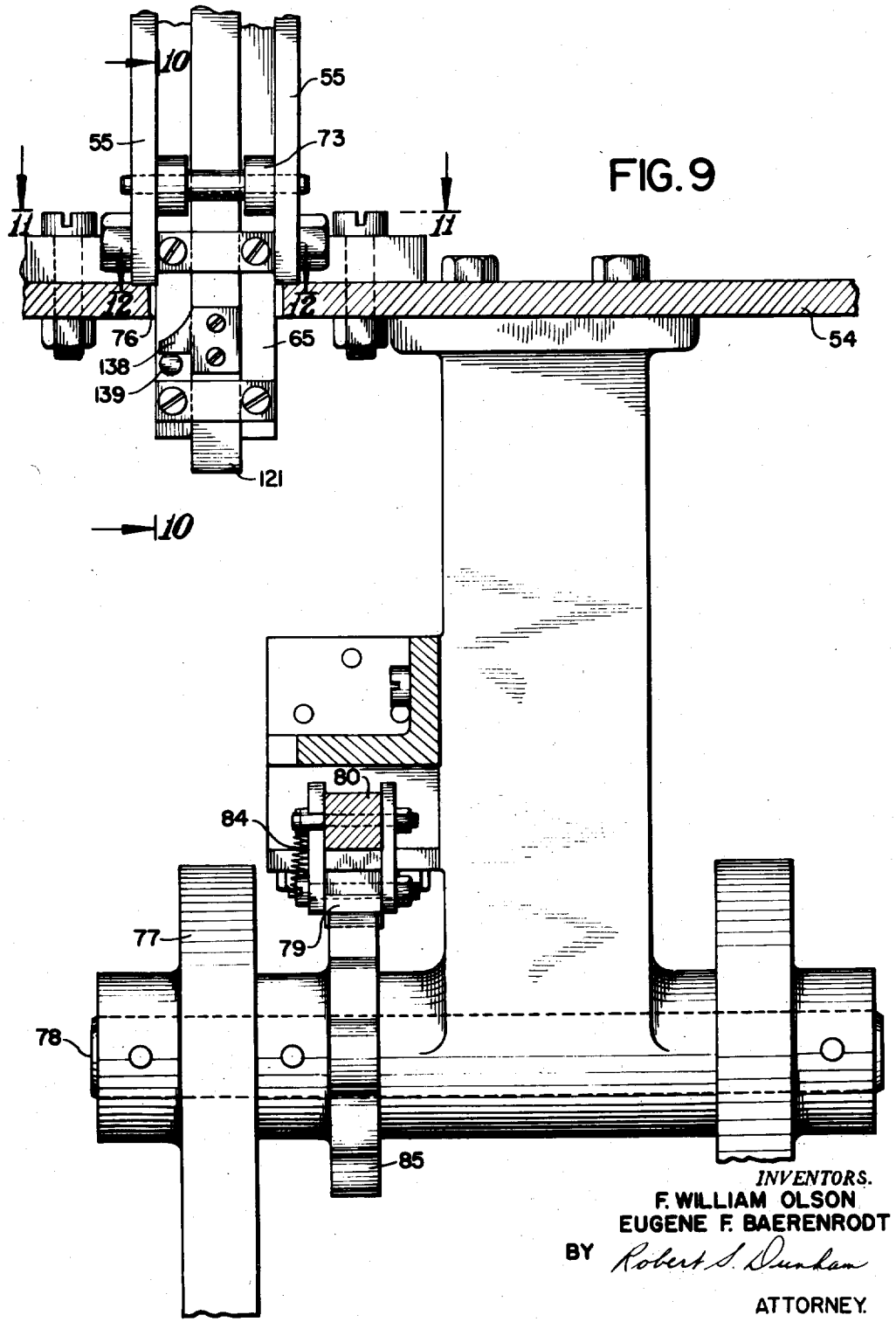
Fig. 9 is a fragmentary expanded vertical section on the line 9—9 of Fig. 1, showing part of the olive depositing system.
Figure 10:
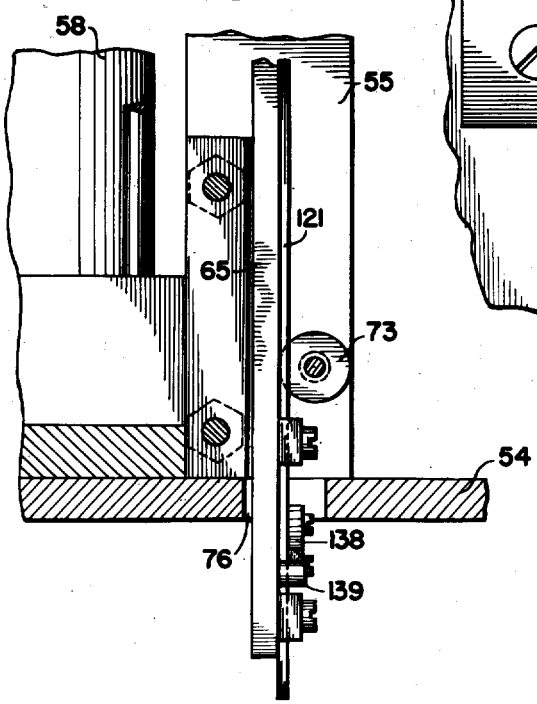
Fig. 10 is a fragmentary vertical section on the line 10—10 of Fig. 9.
Figure 11:
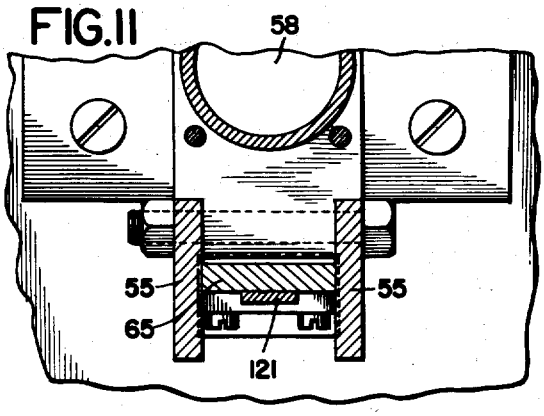
Fig. 11 is a fragmentary horizontal section on the line 11—11 of Fig. 9.
Figure 12:
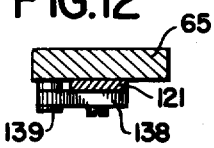
Fig. 12 is a horizontal section on the line 12—12 of Fig. 9.

Since it is necessary to deposit each successive layer of olives on top of the preceding layer, it is necessary to vary the length of the stroke of the reciprocating arm 16 in successive steps. In Figs. 5, 9, 10, 11, 12 a preferred form of [acomplishing] *accomplishing* this result [in] *is* shown in detail. The horizontal cross-arm 56 is secured to a rectangular vertical shaft 65, movably contained within the frame 55, terminating at its upper end by a U-bolt connection 66, connecting the shaft 65, by a line 67 running over pulleys 68, 69, to a counterweight 70. The shaft 65 moves in conjunction with the cross-arm 56 and is guided by pairs of rollers 71, 72, 73, 74, 75 and passes, in the course of its movement, through an aperture 76 in the bed 54 of the machine. Since the shaft 65 moves in conjunction with the reciprocating arm 16 and the length of the stroke of the shaft 65 is determined by the stepped cam 77, which is mounted underneath the bed 54 of the machine and is secured to a shaft 78, the length of the stroke of the reciprocating arm 16 is also determined. The stepped cam 77 as shown in Figs. 5, 6, 7 and 8 and in the expanded view of Fig. 9, is rotated by the action of a pawl 79 upon a ratchet 85 (see also Fig. 1) carried by the shaft 78. The pawl 79 is mounted on a reciprocating arm 80 driven by a piston 81 which operates in a cylinder 82 and is actuated in both directions by compressed air. The arm 80 is limited in its stroke by an adjustable limiting bolt 83 and is returnable to its normal position by a return spring 84.

Figure 6:
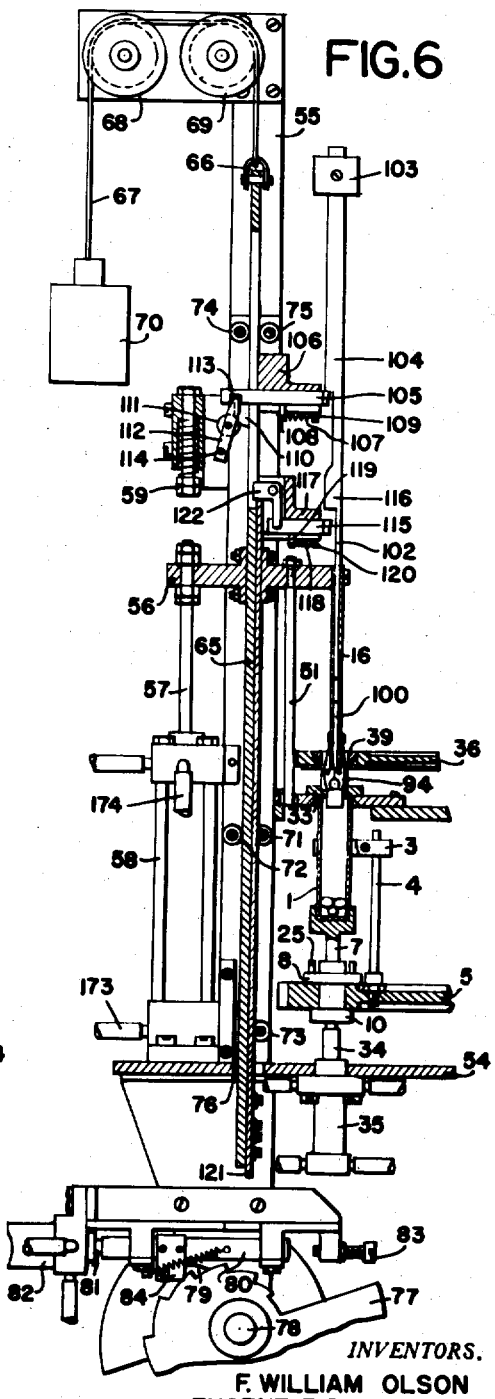
Fig. 6 is a fragmentary side sectional view of the device, showing the olive depositing system at an intermediate position on its stroke.

The steps, of which there are thirteen in number, on on the stepped cam 77 individually correspond in height to the depth of a layer of olives and the cam 77 is advanced one step for each layer of olives deposited in the container 1 undergoing filling (for example, since the specific form of the device illustrated in the drawings is designed for depositing thirteen layers of olives, the cam 77 of necessity here provides for thirteen separate steps). An examination of the position of the shaft 65 in Figs. 5, 6, 7 and 8 shows the shaft 65 in various positions during its downward stroke. Fig. 8 shows the shaft 65 at rest on the stepped cam 77 with the reciprocating arm 16 at the proper level in the container 1 to release the next successive layer of olives.

Each time the reciprocating arm 16 reaches the uppermost portion of its stroke, the above described action of the pawl 79 upon the ratchet 85 serves to rotate the stepped cam 77 by an amount sufficient to present the next successive step for contact with the shaft 65. The cam 77 is disposed so as to permit the greatest length of stroke when the first layer of olives is deposited in the container 1. The cam thereafter presents successive steps in each reciprocation of the reciprocating arm 16, thus uniformly shortening the stroke, as the successive layers of olives are deposited in the container.

There will now be described in detail the mechanism adapted to grasp and release the olives at the proper instant of time. Figures 22 through 26 show in detail various views of the mechanism provided for grasping the olives. The olive holder 39 situated in the annular receptacle 38 in the upper turntable 36 contains a pair of olives 86, 87 in the proper position for disposition.

Figure 23:
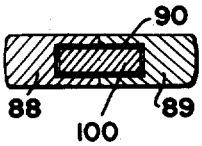
Fig. 23 is a horizontal section on the line 23—23 of Fig. 22.
Figure 26:
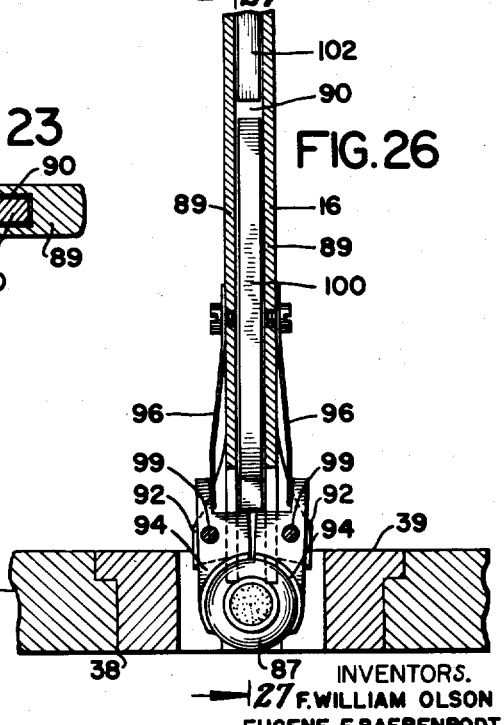
Fig. 26 is a vertical section on the line 24—24 of Fig. 22, showing the olive clamps in a closed position.

The reciprocating arm 16 is made up of identical U-shaped sections 88, 89 (i. e. vertical members of U-shaped cross-section, as shown in Fig. 23) joined together so that their junction forms a rectangular slot 90 running the length of said reciprocating arm 16. The U-shaped sections 88, 89 are secured at the top to the cross-arm 56 (Figs. 5 and 16), and near the bottom carry pairs of wings or laterally projecting members 91, 92 on which are mounted the olive-gripping pairs of finger clamps 93, 94, the pairs of finger clamps 93, 94 being mounted by and pivoted about pairs of rivets 98, 99. The pairs of finger clamps 93, 94 are internally curved in conformity with more than 180° of the circumference of an olive, and are held in a normally closed position by the action of spring members 95, 96.

Figure 5:
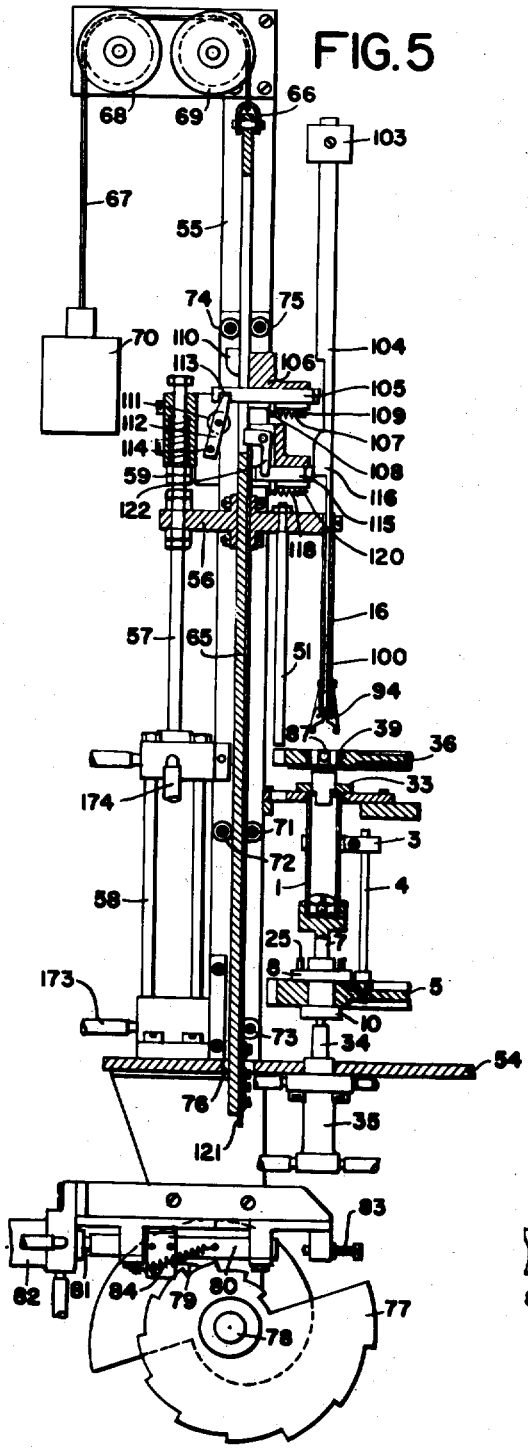
Fig. 5 is a fragmentary side sectional view of the device, showing the olive depositing system on the upper portion of its stroke.
Figure 16:
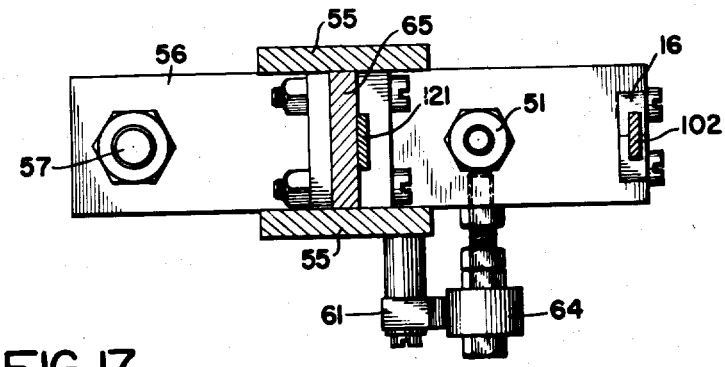
Fig. 16 is a horizontal section on the line 16—16 of Fig. 14.

The rectangular slot 90 widens into a bell-shaped section 97 at the lower extremity of said reciprocating arm 16. Said bell-shaped section 97 contains a slug of metal 100 resting on and contacting both the pairs of finger clamps 93, 94. The slug 100 has an upper portion that extends up into the rectangular slot with a sliding fit, i. e. to move vertically in the slot. Above the slug the slot also receives (with a like sliding fit for vertical reciprocation) the triggering shaft 102, which as shown in Figs. 5, 6 and 16 projects far above the upper separately fastened ends of the members 88, 89 that constitute the arm 16. When pressure is applied to said slug of metal 100 by the triggering shaft 102, the pressure is thus applied to the contacted section of the pairs of finger clamps 93, 94. This pressure, if sufficient to overcome the tension of the pairs of springs 95, 96, causes the finger clamps to pivot about the pairs of pivot points, i. e. the rivets 98, 99, and to assume an open position. Removing this pressure causes the tension of the pairs of springs 95, 96 to force the pairs of finger clamps 93, 94 to assume the closed position.

Figs. 14, 15, 16, 17 and 18 show in detail and Figs. 5, 6, 7 and 8 likewise illustrate for various positions of the stroke of the reciprocating arm 16, the mechanism utilized to control the timing of the opening and closing of the pairs of finger clamps 93, 94 by controlling the application of pressure upon the slug of metal 100 as described above. In Fig. 5 and in the expanded views shown in Figs. 14, 15, 16, 17 and 18 the reciprocating arm 16 is shown, at the uppermost portion of the stroke, above the olive holder 39. Under such circumstances each of the pairs of finger clamps 94 (only one of said pairs being shown in Fig. 5) is held in the open position by the pressure applied to the slug of metal 100 by the triggering shaft 102 which is terminated at its upper end by a weight 103. As the reciprocating arm 16 starts its downward movement, the triggering shaft 102 keeps pressure applied to the slug of metal 100, thus keeping the finger clamps 94 open.

When the finger clamps 94 have descended to sufficient elevation to encompass the olive 87, as shown in Fig. 6, the pressure on the slug of metal 100 is removed by reason of the engagement of a downwardly facing step or shoulder 104 (on the triggering shaft 102) with a horizontal arm 105, the triggering shaft being thereby suspended. The horizontal arm 105 is movably mounted, i. e. to slide horizontally, on a base 106 fastened to the frame 55. Since the horizontal arm 105 is mounted on the base 106 which in turn is fastened to the frame 55, said horizontal arm will always be a fixed calculable distance above the olive holder 39 and the olives 87 held therein. The horizontal arm 105 is normally held in a position adapted to contact the step 104 on the triggering shaft 102 by the tension of a spring 107 secured at one end to a pin 108 mounted on said horizontal arm 105 and secured at the other end to a pin 109 mounted on the immovable base 106. It will now be seen that when the arm 16 first commences its downward stroke, the triggering shaft 102 is resting on the slug 100, keeping the finger clamps 94 open (Fig. 5). They thus remain open until they have respectively descended along the sides of the olive; then the step 104 reaches the arm 105 and the latter holds the triggering shaft (Fig. 6) so that further continuing descent of the arm 16 causes the finger clamps to close upon the olive 87 by the action of the springs, it being now understood that the vertical distance between the arm 105 and the olive holder 39 is selected to effectuate such closure of the clamps at the point just described. The triggering shaft 102 then temporarily remains suspended on the horizontal arm 105 while the reciprocating arm 16, with both pairs of finger clamps 94 closed and holding the olives, moves downward into the container 1, the two olives gripped by the clamps are thus pushed down through the openings in the holder 39.

After the arm 16 has moved further downward for a short distance, a cam 110 secured to the movable vertical shaft 65 (which is secured to the cross-arm 56 and thus descends with the arm 16) contacts a roller 111 mounted on pivoted lever arm 112, said pivoted lever arm 112 engaging a notch 113 on said horizontal arm 105 and being pivoted to the stationary frame at 114. The contact of the cam 110 with the roller causes the lever arm 112 to pivot about the pivot point 114, thus causing the horizontal arm 105 to move out of contact with the step 104 on the triggering shaft 102, and permitting said triggering shaft 102 to fall. The triggering shaft 102, in falling, is then stopped by a horizontal arm 115 contacting another and lower step 116 on the shaft 102, as shown in Fig. 7, before the extremity of said shaft 102 contacts the slug of metal 100. The horizontal arm 115 is movably mounted [(] (i. e. to reciprocate horizontally) in a base 117 secured to the vertically movable shaft 65 and is adapted to be held in a position to contact the step 116 on the triggering shaft 102 by a spring 118 extending between a pin 119 on said horizontal arm 115 and a pin 120 secured to the base 117. The horizontal arm 115 thus intercepts the triggering shaft 102 a short distance before the shaft 102 contacts the slug of metal 100 and thus the triggering shaft 102 now accompanies said reciprocating arm 16 (but still out of contact with the slug 100) as it approaches the desired level for the depositing of the next successive layer of olives.

Figure 28:
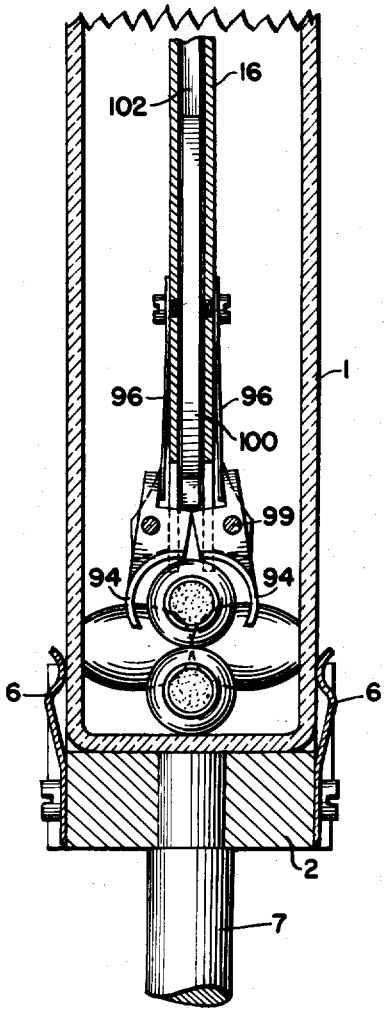
Fig. 28 is a vertical section (like Fig. 24) of the olive holder releasing a pair of olives in the desired alignment in a container.

A shaft 121 movably secured to the vertical shaft (i. e. so as to slide vertically relative to the latter) but normally moving in conjunction therewith contacts the stepped cam 77 (see also Fig. 9) a short time before the vertical shaft 65 contacts the stepped cam 77 and terminates the downward movement of the reciprocating arm 16. The movement of shaft 121 is thus terminated while the shaft 65 continues in a downward direction, and since the base element 117 moves in conjunction with the shaft 65 it is also moving with relation to the shaft 121. This downward movement of the base element 117 causes one arm of a bell crank 122 pivotally mounted on the base element 117 to contact the upper end of the shaft 121 which causes the bell crank to pivot. Accordingly the other arm of the bell crank 122 in turn moves or retracts the horizontal arm 115 a sufficient distance to permit the triggering shaft 102 to fall and contact the slug of metal 100. In this manner, by the weight of the triggering shaft (and its weight 103) released on the slug 100, the finger clamps 94 are caused to open and release the olives when the vertical shaft 65 and consequently the reciprocating arm 16 of the olive depositing mechanism has reached the lowermost portion of its stroke, as shown in Fig. 8 and the expanded view of Fig. 28. The triggering shaft 102 remains in contact with the slug of metal 100, thus keeping the finger clamps 94 in an open position during the entire upward stroke as illustrated in Fig. 5, and also on the downward return stroke until the step 104 engages the horizontal arm 105, as shown in Fig. 6.

In Figs. 9, 10, 11 and 12 there is shown an expanded view of the above-mentioned shafts 65 and 121 together with the stepped cam 77. The extension of the shaft 121 beyond, i. e. below, the main shaft 65 is determined by a stop 138 on the shaft 121 contacting a pin 139 on the shaft 65, said stop 138 normally resting on the pin 139 and held in such position by the weight of the shaft 121.

THE GUIDING MEANS

Figure 19:
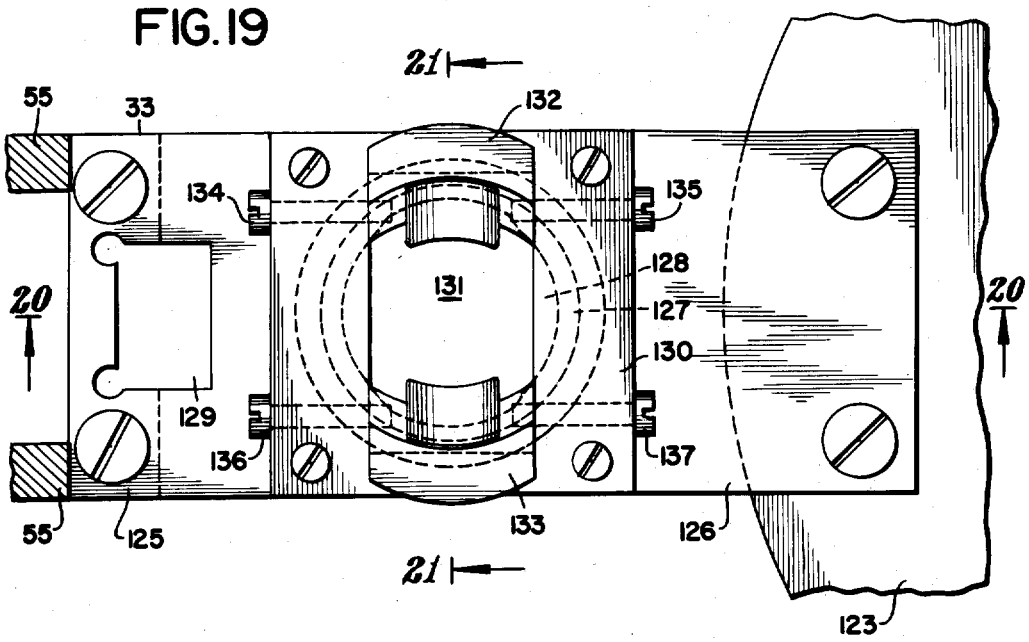
Fig. 19 is an expanded plan view of the means utilized to guide the olive holders into the jar.
Figure 20:
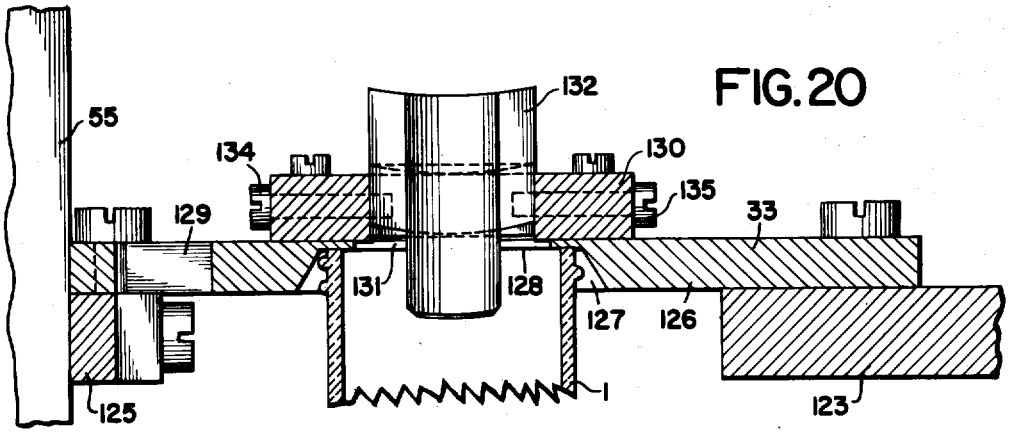
Fig. 20 is a vertical section on the line 20—20 of Fig. 19.
Figure 21:
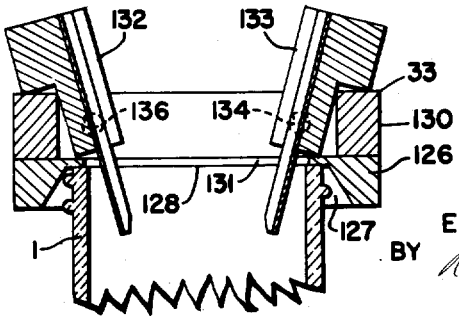
Fig. 21 is a vertical section on the line 21—21 of Fig. 19.
Figure 22:
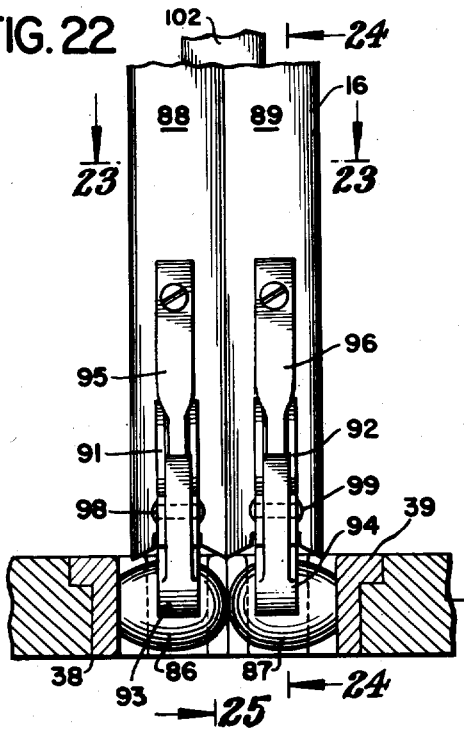
Fig. 22 is a fragmentary expanded side view of the reciprocating arm of the olive depositing system.
Figure 25:
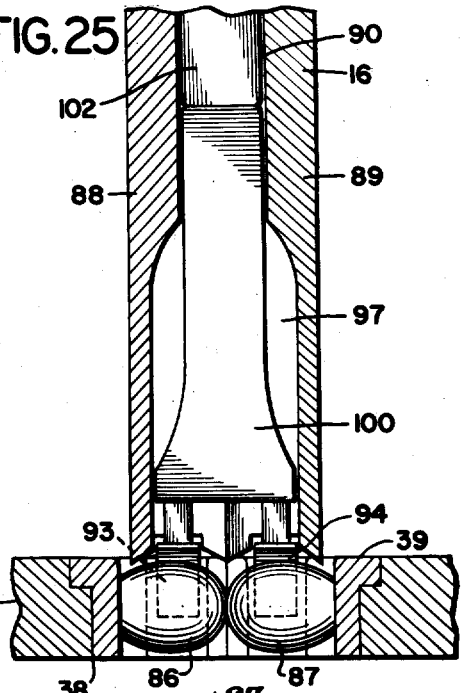
Fig. 25 is a vertical section on the line 25—25 of Fig. 24.
Figure 24:
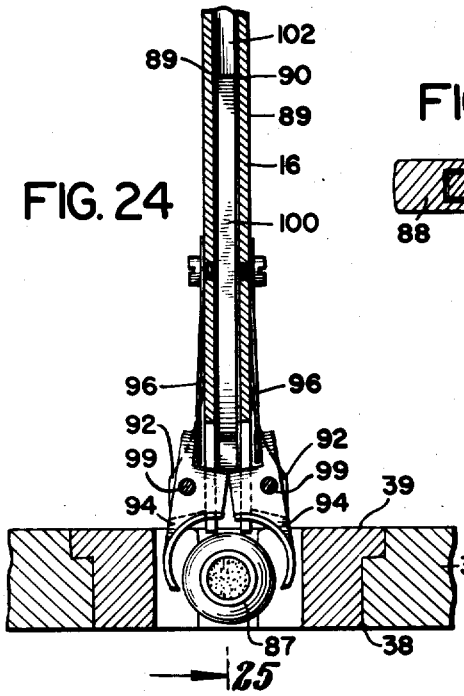
Fig. 24 is a vertical section on the line 24—24 of Fig. 22 showing the olive clamps in an open position.

For the purpose of guiding the reciprocating arm 16 of the olive depositing mechanism into the container being filled special guiding means are advantageously provided. In Fig. 1 a non-rotating circular plate 123 is secured to the non-rotating hollow shaft 14 immediately below the upper turntable 36 and a short distance above the collar 12. The plate 123 serves as a mount for supporting bolts 124 which in turn support a flat non-rotating plate 124A adjacent to the underside of the upper turntable 36 and also serves as a mount together with the lug 125 on the frame 55, for the base plate 126 of the guiding means 33. Figs. 19, 20 and 21 show in detail the guiding means 33. The base plate 126, supported by the plate 123 and the lug 125, contains an annular recessed portion 127 with an aperture 128 centered therein, on the underside of said plate 126, adapted to receive the mouth of the container 1 to be filled, and to secure the container 1 against movement thereof. The plate 126 also has a rectangular aperture 129 adapted to permit the passage of the guide bar 51.

Figure 27:
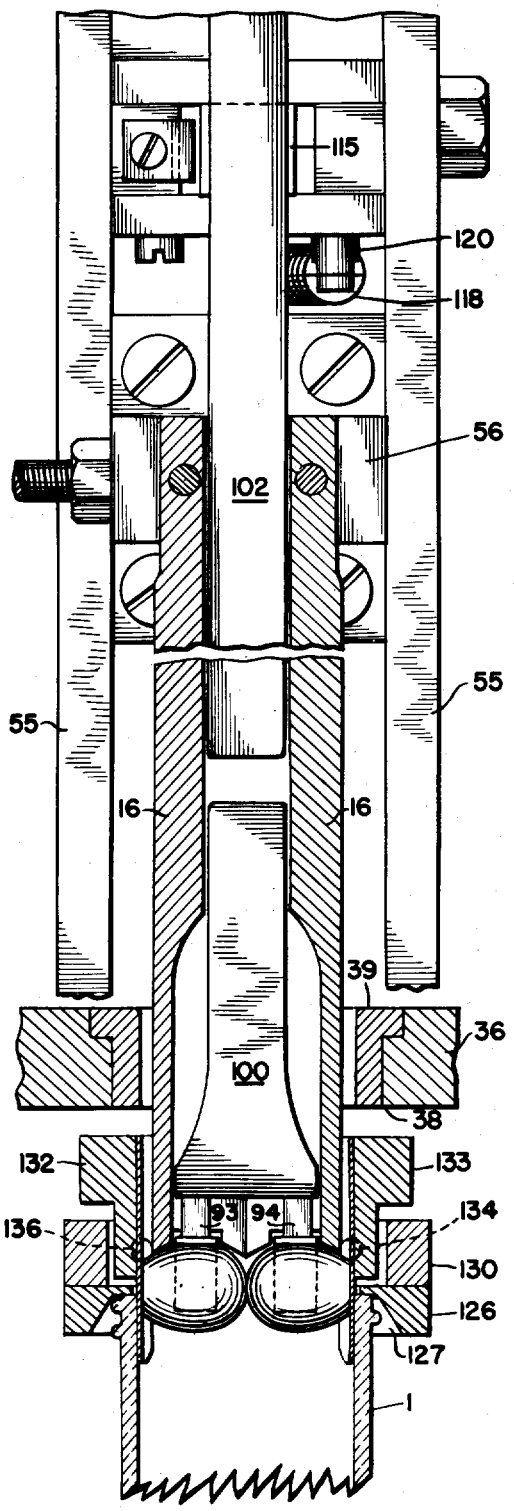
Fig. 27 is an expanded vertical section on the line 27—27 of Fig. 26.

Mounted on the upper surface of the plate 126 is a smaller rectangular plate 130 containing a rectangular aperture 131 centered over the aperture 128 and disposed to permit the passage of the reciprocating arm 16 of the olive depositing mechanism. Curved guiding elements 132, 133 are pivotally mounted (on horizontal axes) at the smaller extremities of the rectangular aperture 131 by bolts 134, 135, 136, 137, and adapted, through their own weight, to rest normally in an inclined position (e. g. as clearly shown in Fig. 21). When the reciprocating arm 16 approaches the curved elements 132, 133, said curved elements 132, 133 guide the reciprocating arm 16 into correct alignment for entrance into the container 1, pivoting about the bolts 134, 135, 136, 137 and into a vertical position as reciprocating arm continues its downward movement between the elements as shown in Fig. 27, the curved elements being moved into vertical position by the sliding engagement of the ends of the olives and being thereafter retained in substantially vertical position by like engagement of the sides of the arm 16. On the upward stroke of the reciprocating arm 16 the curved elements 132, 133 will assume their normal (inclined) position when the reciprocating arm 16 clears the curved elements 132, 133.

It will be noted that the guiding surfaces of the elements 132, 133 advantageously have a curve, which is concentric and nearly identical with the inside of the container 1, each such surface including a sheet-like portion or part that depends below the body of the guide element and into the mouth of the container. Thus each element has a thin, depending lip or skirt having a surface configuration essentially like that of the container and adapted to move into close conformity with the interior wall of the latter as shown in Fig. 27. In consequence, each pair of olives is moved freely into the wide, funnel-like opening first provided by the elements (Fig. 21) and then slides smoothly past the curved surfaces of the latter and their skirts (Fig. 27) without obstruction at the container mouth.

CONTROL AND TIMING SYSTEM

In effectuating the above described operations the machine includes a control and timing system to regulate the sequence of the several mechanical movements.

The control system here utilized may be generally described as a system of cam actuated piston valves controlling the application of compressed air to the various cylinders supplying the motive power to the elements of the device. The cams are mounted on two main shafts and are driven by an external power source (i. e. an electric motor in the embodiment illustrated in the drawings). All the above mentioned cylinders are double acting, that is, they require the application of compressed air to actuate the piston in either direction.

Fig. 2 shows generally the system of cams and the associated drive mechanism utilized to control the timing of the various sequences of operations. The main drive for the control system is a standard electric motor 140 driving a worm 141 through the utilization of a pulley 142 mounted on the shaft of the motor 140, a pulley 143 mounted on the shaft of the worm 141 and a belt 144 mounted on the pulleys 142, 143. The worm 141 drives a worm gear 145 securely mounted on a shaft 146. Cams 147, 148, 149, 150, 151, 152 and a worm 153 are securely mounted on and rotate with the shaft 146. Mounted on a shaft 154 and engaging the worm 153 is a worm gear 155 disposed to rotate the shaft 154 once for every thirteen revolutions of the shaft 146. Shaft 154 serves as a mounting for the cams 156, 157, 158 and 159, which of course rotate in conjunction with said shaft 154. Thus, through the above described gear mechanism, the electric motor 140 drives the entire system of cams, which in turn, control the application of air pressure to the various cylinders.

Figure 31:
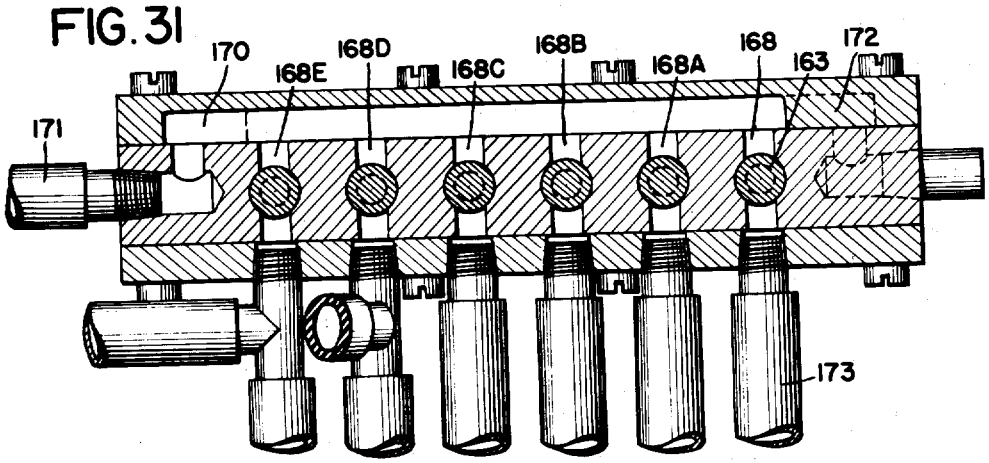
Fig. 31 is a horizontal section on the line 31—31 of Fig. 29.

Figs. 29, 30 and 31 show in detail said cams 147 through 152 and the associated mechanism utilized to control and time the application of compressed air to various of the cylinders, which, in turn, control the movements of the corresponding operating elements of the apparatus. For the purpose of convenience the structure of one of the cam systems will be described in detail, it being understood that the other cam systems are identical as far as construction is concerned. However, it will be appreciated that for proper timing of machine operations, the shapes of the several cams and their relative angular positions on the shaft 146 differ, from cam to cam, in accordance with the requirements of the corresponding operations; in view of the example to be described and the foregoing explanation of various functional relationships in the machine, the specific contours appropriate for the different cams 147–152 (and also the cams 156–159 on the shaft 154) will become readily manifest to persons skilled in the art, without further description here.

The cam 152, mounted on the shaft 146, said shaft being driven in a manner as described above, is in contact with a roller 160 mounted on a lever arm 161 which pivots about its mounting 162. Said lever arm or follower 161 rests on the end of a plunger or valve slide 163 which has spaced necked down or reduced sections 166, 167, and which is mounted in a valve cylinder 165 and held in the closed position as shown in Fig. 30 by a spring 164. The valve cylinder 165 contains two horizontal passages 168, 169, spaced to register with said necked down portions 166, 167 of said plunger 163, the plunger 163 being normally disposed (by the spring 164, as shown) to block said passages 168, 169. The upper passage 168 is connected to a common passage 170 (see also Fig. 31) which, in turn, is connected to the supply of compressed air through the pipe 171. The passages 168A, B, C, D and E on the other and identical valves controlled by the other cams are also connected to this common passage 170. The passage 169 is connected to a common exhaust passage 172, as are the corresponding passages 169A, B, C, D, and E of the other valves.

Figure 33:
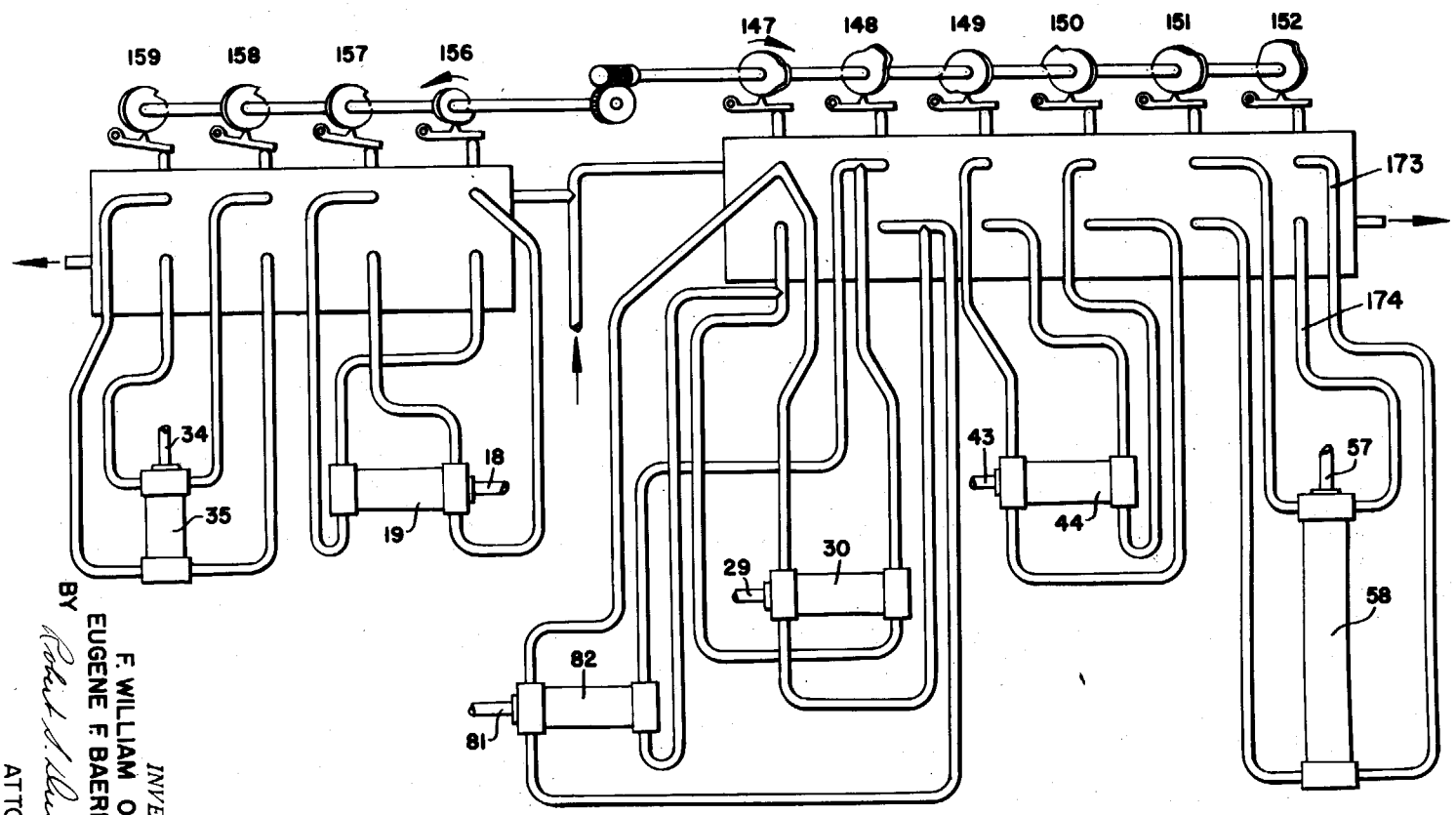
Fig. 33 is a schematic diagram of the entire control and timing system.

In the normal operating position as shown in Fig. 30 the plunger 163 is held by the spring 164 in such a manner as to keep the passages 168, 169 closed. As the cam 152 rotates about the shaft 146, the cammed surface will contact the roller 160 and depress the lever arm 161, and the plunger 163 will be depressed to bring the necked down portions 166, 167 into alignment with the passages 168, 169, thus permitting the compressed air to flow from the common passage 170, past the necked down portion 166 and through the pipe 173 which is directly connected to one side of the cylinder 58 (see Fig. 1). Fig. 33 shows schematically the control and timing system and it is to be noted that each valve plunger is disposed to permit the application of compressed air to one end of each cylinder and simultaneously open the exhaust port from the opposite end of said cylinder. Thus the depression of the valve plunger 163 permits both the application of compressed air to one side of the cylinder 58 through the pipe 173 and the opening of an exhaust passage through the pipe 174 to the exhaust chamber or manifold 172 on the other end of the cylinder 58, thus permitting the resultant difference in pressure to move the piston. The cams 147–151 and their associated mechanisms function in a similar manner as that described for the cam 152, except that the valve plungers and cylinders corresponding to cams 157 and 158 are so fashioned as to open the controlled passages in the normal position of the plungers under the pressure of the springs, such valves being then closed only when the cam follower depresses the plunger.

Figure 32:
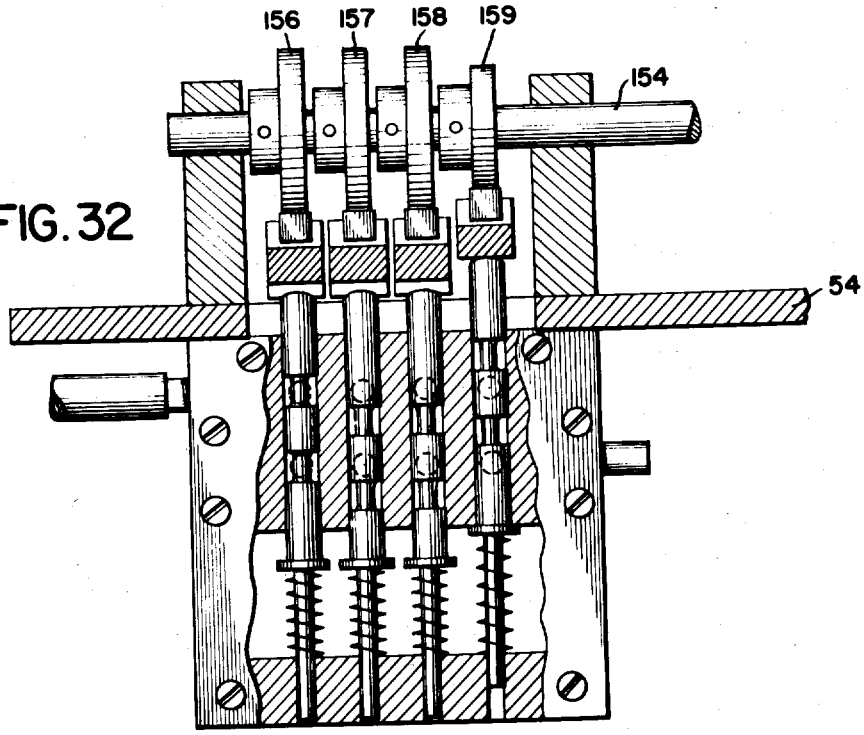
Fig. 32 is a side view of the control and timing system on the line 32—32 of Fig. 2.

Fig. 32 shows in detail the cams mounted on the shaft 154. The same mechanical construction is utilized here for the cams, followers, valves, manifolds and connecting pipes, as was utilized for cam 152 and those described above, with the exception as to cams 157 and 158 as explained above. Again the construction only varied in the shape of the various cams which in turn controls the precise instant of time at which the respective valve plungers are either depressed or permitted to rise to control the application of compressed air to the various cylinders.

Fig. 33 is a schematic diagram of the control and timing system and the connections embodied therein. All the mechanical movements involved in the operation of the device are actuated by the application of compressed air to various cylinders embodied in the machine. The schematic diagram as shown in Fig. 33 can be most easily explained by carefully examining the sequence of operations involved in the filling of the containers.

It will be assumed as a starting point, for entry into the sequence of operations, that the container at the dwell point has just been filled and that it has been dropped down to its normal position resting on the lower turntable 5 and that an empty container is in the adjacent position, ready to be placed into position at the dwell point. In order to accomplish this, it is necessary to rotate the lower turntable 5 and place the new container in the desired location. At this instant of time the cam 157 permits the elevation of the corresponding valve plunger which in turn admits compressed air to the cylinder 19 in such a manner as to move the piston 18 to its extended position. This movement of said piston 18 in turn actuates the reciprocating arm 17 so that the pawl 15 mounted thereon engages the ratchet 9 and rotates the lower turntable. The new container will now be at the dwell point, and it is necessary to raise the container into contact with the guiding means 33. This is accomplished by the action of the cam 159 which effects the depression of the corresponding valve plunger and admits compressed air to the cylinder 35 in such a manner as to cause the piston 34 to move into its extended position holding the container in close contact with the guiding means 33. While the container is being raised into contact with the guiding means 33 the cam 156 depresses the corresponding valve plunger and applies compressed air to the cylinder 19 in such a manner as to cause the piston 18 to move from its extended to its withdrawn position, the cam 157 having already depressed its valve plunger and thus cut off the air supplied to the other end of the cylinder 19. The container is now in the correct position to start the filling operation.

At this point it will be assumed that the olive holder 39 resting in the corresponding aperture 38 in the upper turntable 36 contains two olives in the proper position for deposition. The reciprocating arm 16 which has been in the uppermost position as the above mentioned container was being placed at the dwell point starts its downward motion due to the cam 151 depressing the corresponding valve plunger and admitting compressed air to the cylinder 58 in such a manner as to drive the piston 57 from its extended position to its withdrawn position. After the olives have been deposited at the bottom of the new container, the cam 152 by depressing the corresponding valve plunger admits compressed air to cylinder 58 in such a manner as to drive the piston 57 to its extended position. When said reciprocating arm 16 has cleared the container and the guiding means 33 on its upward stroke, cam 150 depresses the corresponding valve plunger and admits compressed air to cylinder 44 in such a manner as to drive the piston 43 to its extended position, thus rotating the upper turntable 36 a sufficient amount to present the adjacent filled olive holder 39 to the dwell position.

Simultaneously with the aforementioned movement cam 148 depresses the corresponding valve plunger and causes compressed air to be admitted to the cylinders 30 and 82 at the same time. The compressed air admitted to the cylinder 30 causes the piston 29 to move from its extended position to its withdrawn position, and in so doing moves the reciprocating arm 28 and causes the pawl 26 to engage the pin 25 on the upper flanged surface of the flanged collar 8 and thus rotates the flanged collar 8, together with the container, through a quarter circle. The compressed air admitted to the cylinder 82 causes the piston 81 to move from its withdrawn position to its extended position, thus moving the reciprocating arm 80 and causing the pawl 79 to engage the ratchet 85, said engagement causing a new and higher step on the stepped cam 77 to be presented for contact with the shaft 65 on the next downward stroke of the reciprocating arm 16 of the olive depositing mechanism.

At or about this stage in the operations, the cam 149 in engaging the corresponding valve plunger admits compressed air to the cylinder 44 causing the piston 43 to be moved to its withdrawn position from its extended position and thus the piston 43 which ultimately causes the upper turntable 36 to rotate will now be in a position to rotate said turntable 36 on the next cycle of the reciprocating arm 16 of the olive depositing mechanism. Cam 147 provides for the return of the pistons in the cylinders 30 and 82. When the cam 147 engages the corresponding valve plunger, compressed air is admitted to the cylinder 82 in such a manner as to cause the piston 81 to be moved from its extended position to its withdrawn position and the cam 147 simultaneously provides for the application of compressed air to cylinder 30 causing the piston 29 to move from its withdrawn position to its extended position.

In one stage of the above enumerated series of operations, the reciprocating arm 16 of the olive deposition mechanism moved from its uppermost position down past the olive holders 39, grasping two olives at that level, and then moved on down to the container and deposited the olives therein. When the reciprocating arm 16 cleared the container and the guide means on the return stroke, the other operations, i. e. that of rotating the upper turntable 36, revolving the container through a 90° arc, and presenting a new step on the stepped cam 77, occurred while the reciprocating arm 16 was at the top of its stroke. When the reciprocating arm thus reaches its uppermost position it is then ready to start its downward stroke again and the entire sequence of operations is then repeated. It is to be noted at this point that the control system for rotating the lower turntable 5 and raising the container into its proper position in contact with the guiding means operates only once for every thirteen complete cycles of the other mechanism, i. e. the reciprocation of the reciprocating arm 16 of the olive depositing mechanism, the rotation of the upper turntable 36, the rotation of the container undergoing filling through 90° and the presentation of a new step on the stepped cam 77.

When the container at the dwell point has deposited therein thirteen successive layers of olives, the cam 158 will permit the elevation of the corresponding valve plunger and admit compressed air to the cylinder 35 causing the piston 34 to move from its extended position to its withdrawn position, thus dropping the container out of contact with the guiding means 33 and down to the level of the lower turntable 5. After the container has been withdrawn from contact with the guiding means 33, the cam 157 will permit the elevation of the corresponding valve plunger and admit compressed air to the cylinder 19 in such a manner as to move the piston 18 to its extended position, such movement resulting, as will now be understood, in a rotation of the lower turntable a sufficient amount to present a new container at the dwell point. When the new container is presented at the dwell point, cam 159 depresses the corresponding valve plunger and admits compressed air to cylinder 35 in such a manner as to raise the container into contact with the guiding means at which time the reciprocating arm 16 of the olive depositing mechanism begins its downward stroke and the entire sequence of operations is then repeated completely.

It will now be seen that the apparatus efficiently satisfies the several objects described at the outset of this specification and there is provided a completely automatic device to accomplish the packing of articles, such as olives, cherries or the like, in a neat, attractive and efficient manner, such as is prescribed or preferred by the trade. Although it will now be appreciated that apparatus of the character disclosed is readily adapted (e. g. by suitable replacement of parts such as olive holders, depositing clamps, jar supports and the like) for operation with other sizes and shapes of [jaws] *jars*, with other sizes, number per layer, and arrangements of olives, or indeed with various articles such as cherries, other fruits, pickled comestibles of bulbous shape, and similar things, the specific machine here depicted is of notable significance, not only to represent the manner in which the invention has solved these peculiar problems of automatic packing, but also to provide a specific package that satisfies certain common or average requirements of the industry, in a remarkably efficient manner.

In accordance with the provisions of the patent statutes, we have herein described the principle of operation of this invention, together with the elements which we now consider the best embodiments thereof, but we desire to have it understood that the structure disclosed is only illustrative and the invention can be carried out by other means. Also, while it is designed to use the various features and elements in the combinations and relations described, some of these may be altered and modified without interfering with the more general results outlined within the spirit of the invention.

We claim:

1. Apparatus for packing articles in a container in successive layers, each layer being rotationally disposed a fraction of a circle from the adjacent layers, comprising, tabular rotational means for presenting the container at a loading locality, tabular rotational means for presenting the articles at the loading locality, means for depositing the articles in the container, comprising, a reciprocating arm, means mounted on said arm to grasp the articles at the loading locality and release the articles at the desired level in said container, and means for rotating the container at the loading locality to accomplish the desired positional deposition.

2. Apparatus for packing articles in a container in successive layers, each layer being rotationally disposed a fraction of a circle from the adjacent layers, comprising, tabular rotational means for presenting the container at a loading locality, tabular rotational means for presenting the articles at the loading locality, means for depositing the articles in the container at the loading locality, comprising, a reciprocating arm having a variable length of stroke, the length of stroke decreasing a predetermined amount on each successive reciprocation of the reciprocating arm, clamping members mounted on the lower extremity of the reciprocating arm to grasp the articles at the loading locality and release the articles at the desired level in the container, and means for rotating the container at the loading locality to accomplish the desired positional deposition.

3. Apparatus for packing articles in a container in successive layers, each layer being rotationally disposed a fraction of a circle from the adjacent layers, comprising, a displaceable container supporting platform for successively presenting containers to be filled at a loading locality, a displaceable article supporting platform for successively presenting the articles to be packed above the mouth of the container positioned at the loading locality, means for depositing the articles in the container, comprising, a reciprocating arm positioned to move vertically in a straight line determined by said container and article positioned at the loading locality and having a variable length of stroke, arresting means positioned in the line of reciprocation of said arm for decreasing the length of stroke thereof a fixed amount on each successive reciprocation of the reciprocating arm, spring tensioned clamping members mounted on the lower extremity of the reciprocating arm, associated pressure means responsive to the position of said arm during reciprocation thereof to actuate the grasping of the articles at the loading locality by the spring tensioned clamping members and to actuate the release of the articles at the desired level in the container at the loading locality, and means for rotating the container at the loading locality intermediate successive article depositions therein to accomplish the desired positional deposition.

4. Apparatus for packing articles in a container in successive layers, each layer being rotationally disposed a fraction of a circle from the adjacent layers, comprising, tabular rotational means for presenting the container at a loading locality, tabular rotational means for presenting the articles at the loading locality, means for depositing the articles in the container at the loading locality, comprising, a reciprocating arm having variable length of stroke, the length of stroke decreasing a predetermined amount on each successive reciprocation of the reciprocating arm, clamping members mounted on the lower extremity of the reciprocating arm to grasp the articles at the loading locality and release the articles at the desired level in the container, means for rotating the container at the loading locality to accomplish the desired positional deposition, and associated means to control the periodicity of the movements of the aforesaid means.

5. Apparatus for packing articles in a container in successive layers, each layer being rotationally disposed a fraction of a circle from the adjacent layers, comprising, tabular rotational means for presenting the container at a loading locality, tabular rotational means for presenting the articles at the loading locality, means for depositing the articles in the container at the loading locality, comprising, a reciprocating arm having a variable length of stroke, the length of stroke decreasing a predetermined amount on each successive reciprocation of the reciprocating arm, clamping members mounted on the lower extremity of the reciprocating arm to grasp the articles at the loading locality and release the articles at the desired level in the container, means for rotating the container at the loading locality to accomplish the desired positional deposition and associated means to control the periodicity of the movements of the aforesaid means, comprising, a plurality of cam actuated valves to control the application of motive power to the aforesaid means.

6. Apparatus for packing articles in a container in successive layers, each layer being rotationally disposed a fraction of a circle from the adjacent layers, comprising, means for presenting the container at a loading locality, means for presenting the articles at the loading locality, means for depositing the articles in the container, comprising, a reciprocating arm having a variable length of stroke, the length of stroke decreasing a predetermined amount on each successive reciprocation of the reciprocating arm, spring tensioned clamping members mounted on the lower extremity of the reciprocating arm, associated pressure means to actuate the grasping of the articles at the loading locality by the spring tensioned clamping members and to actuate the release of said articles at the desired level in the container at said loading locality, means for rotating the container at the loading locality to accomplish the desired positional deposition and associated means to control the periodicity of the movements of the aforesaid means, comprising, a plurality of cam actuated valves adapted to control the application of motive power to the aforesaid means.

7. In apparatus for packing articles in a container in successive layers, a reciprocating arm having a variable length of stroke, means connected to said arm and reciprocating in conjunction therewith, a rotatably mounted stepped cam positioned to engage said last mentioned means upon reciprocation thereof, said stroke length decreasing a predetermined amount on each successive reciprocation of the reciprocating arm as determined by the rotational position of the stepped cam, spring tensioned clamping members mounted on the lower extremity of the reciprocating arm and associated pressure means to control the grasping of the articles at a loading locality by the spring tensioned clamping members and to control the release of the articles at a desired level in a container positioned at the loading locality.

8. In apparatus for packing articles in a container in successive layers, a reciprocating arm having a variable length of stroke, means connected to said arm and reciprocating in conjunction therewith, a rotatably mounted stepped cam positioned to engage said last mentioned means upon reciprocation thereof, the length of stroke decreasing a predetermined amount on each successive reciprocation of the reciprocating arm as determined by the rotational position of the stepped cam, spring tensioned clamping means mounted on the lower extremity of the reciprocating arm, comprising a plurality of curved clamping members held in a closed position by spring tension, associated triggering means to control the grasping of the articles at a loading locality by the clamping members and to control the release of the articles at a desired level in a container positioned at the loading locality, comprising, a weighted element disposed to contact said curved clamping members and hold them in an open position and associated means for controlling the application of the weighted element to the curved clamping members.

9. A depositing device, comprising, a reciprocating arm having a variable length of stroke, means connected to said arm and reciprocating in conjunction therewith, a rotatably mounted stepped cam positioned to engage said last mentioned means upon reciprocation thereof, the length of stroke decreasing a predetermined amount on each successive reciprocation of the reciprocating arm determined by the rotational position of the stepped cam, clamping means mounted on the lower extremity of the reciprocating arm, comprising, a plurality of pivotally mounted curved clamping members, spring members to hold the curved clamping members in a closed condition, associated means to close the curve clamping members around articles to be deposited at a loading locality and to open the curved clamping members at a predetermined level, comprising, a weighted member, slidably contained within and extending beyond the upper extremity of the reciprocating arm, the lower extremity of the weighted member being in movable contact with the curved clamping members and associated means to control the application of the weighted member to the curved clamping members comprising a plurality of positioned arresting members disposed to remove the weighted member from contact with the clamping members when the clamping members are at the loading locality and to release the weighted member when the clamping members are at a point of desired deposition.

10. A depositing device comprising a frame of fixed parallel upright members, a reciprocable movable member contained within the parallel members having a variable longitudinal length of stroke, a rotatably mounted stepped cam positioned to engage said movable member and terminate the movement thereof, means to rotatably displace said stepped cam to effect a predetermined decrease in length of stroke on each successive reciprocation of the movable member, a reciprocating arm secured to the movable member and moving in conjunction therewith, clamping means mounted on the lower extremity of the reciprocating arm, comprising, a plurality of pivotally mounted curved clamping members, spring members to hold the clamping members in a closed condition, a weighted member to overcome the tension of the spring members holding the curved clamping members in a closed condition slidably contained within and extending beyond the upper extremity of the reciprocating arm, the lower extremity of the weighted member being in movable contact with the curved clamping members, and means to control the position of the weighted member with respect to the curved clamping members comprising a plurality of positioned arresting elements disposed to support the weighted member out of contact with the clamping members when the clamping members are at an article grasping locality and disposed to release the weighted member when the clamping members are at a point of desired deposition.

11. Apparatus for packing articles in a container in successive layers, comprising means for holding a container, reciprocating means adapted to receive successive articles and advance them, on respectively successive strokes, into said container, a rotatably displaceable stepped cam positioned in the path of reciprocation of said reciprocating means to arrest the same at progressively different localities within said container, and means for rotatably displacing said stepped cam intermediate successive strokes of the advancing means, so that on successive strokes the latter is arrested at progressively higher localities within the container.

12. Apparatus for packing articles in a container, comprising means for holding a container, means disposed above the container and including a vertical aperture positioned in predetermined relation to the container holding means for releasably holding an article to be packed, means for displacing articles from said article-holding means into the container, said last-mentioned means comprising an elongated supporting structure adapted to reciprocate lengthwise through the aperture into the container, releasable article-gripping means at the leading end of said elongated structure, said article-gripping means being normally biased in article-holding position and having pressure responsive means for displacement into article-releasing position, means slidable lengthwise of said elongated structure for applying pressure to said pressure responsive means, and means associated with the elongated structure and controlled in accordance with the position thereof, for controlling said pressure-applying means to effect release of the article when the same is disposed at a predetermined level within the container.

13. Apparatus for packing articles in a container in successive layers, each layer having a predetermined angular displacement relative to an adjacent layer, comprising means for presenting the container at a loading locality, means for presenting the articles at the loading locality, means for inserting the articles into the container comprising a reciprocating arm having a variable length of stroke, a stepped cam in the line of the stroke, the length of stroke decreasing a predetermined amount on each successive reciprocation of the reciprocating arm determined by the position of the stepped cam, clamping means mounted on the lower extremity of the reciprocating arm comprising, a plurality of pivotally mounted curved clamping members, spring members to hold the curved clamping members in a closed condition, associated means to close the curved clamping members around articles to be deposited at the loading locality and to hold said articles during their advance into the container and to open the curved clamping members at a predetermined level within said container, comprising a weighted member, slidably contained within and extending beyond the upper extremity of the reciprocating arm, the lower extremity of the weighted member being in movable contact with the curved clamping members, associated means to control the application of the weighted member to the curved clamping members comprising a plurality of positioned arresting members disposed to remove the weighted member from contact with the clamping members when the clamping members are at the loading locality and to release the weighted member when the clamping members are at a point of desired deposition, and means for rotating the container at the loading locality intermediate successive depositions to accomplish the desired angularly displaced positional deposition.

14. Apparatus for packing articles in a container in successive layers, each layer having a predetermined angular displacement relative to an adjacent layer, comprising, means for presenting the container at a loading locality, means for presenting the articles at the loading locality, means for inserting the articles into the container comprising, a frame of fixed parallel upright members, a movable member contained within the parallel members having a variable longitudinal length of stroke, a stepped cam in the line of the stroke for progressively limiting the length of stroke on successive reciprocations of said movable member, a reciprocating arm secured to the movable member and moving in conjunction therewith, clamping means mounted on the lower extremity of the reciprocating arm comprising, a plurality of pivotally mounted curved clamping members, spring members to hold the clamping members in a closed condition, a weighted member to overcome the tension of the spring members holding the curved clamping members in a closed condition slidably contained within and extending beyond the upper extremity of the reciprocating arm, the lower extremity of the weighted member being in movable contact with the curved clamping members, means to control the position of the weighted member with respect to the curved clamping members comprising a plurality of positioned arresting elements disposed to support the weighted member out of contact with the clamping members when the clamping members are at the article grasping locality for effecting closure of said clamping members about said articles and disposed to release the weighted member when the clamping members are at the point of desired deposition within the container for effecting a release of said articles, and means for rotating the container at the loading locality intermediate successive depositions to accomplish the desired angularly displaced positional deposition.

15. Apparatus for packing articles in a container, comprising means for holding a container, means disposed above the container and including a vertical aperture for releasably holding an article to be packed, means for displacing articles from said article-holding means into the container, said last-mentioned means comprising an elongated supporting structure adapted to reciprocate lengthwise through the aperture into the container along a path having a predetermined relation with the container holding means, releasable article-gripping means at the leading end of said elongated structure, said article-gripping means being normally biased in article-holding position and having pressure responsive means for displacement into article-releasing position, means slidable lengthwise of said elongated structure for applying pressure to said pressure responsive means, means associated with the elongated structure and controlled in accordance with the position thereof, for controlling said pressure-applying means to effect release of the article when the same is disposed within the container, and means intermediate the article holding means and the container to guide said elongated structure into said container comprising a plurality of curved guiding members pivotally mounted on a supporting member.

16. Apparatus for packing articles in a container in successive layers, each layer having a predetermined angular displacement relative to an adjacent layer, comprising means for presenting the container at a loading locality, means for presenting the articles at the loading locality including means disposed above the container having a vertical aperture for releasably holding the articles to be packed, means passing through said vertical aperture for inserting the articles into the container comprising a reciprocating arm having a variable length of stroke, a stepped cam in the line of the stroke for progressively limiting the length of stroke on successive reciprocations of said arm, clamping means mounted on the lower extremity of the reciprocating arm comprising, a plurality of pivotally mounted curved clamping members, [spring members to hold the curved clamping members,] spring members to hold the curved clamping members in a closed condition, associated means to close the curved clamping members around articles to be deposited at the loading locality and to hold said articles during their advance into the container and to open the curved clamping members at a predetermined level within the container, comprising a weighted member, slidably contained within and extending beyond the upper extremity of the reciprocating arm, the lower extremity of the weighted member being in movable contact with the curved clamping members, associated means to control the application of the weighted member to the curved clamping members comprising a plurality of positioned arresting members disposed to remove the weighted member from contact with the clamping members when the clamping members are at the loading locality for effecting closure of said clamping members about said aritcles and to release the weighted member when the clamping members are at a point of desired deposition for effecting a release of said articles, means for rotating the container at the loading locality intermediate successive article depositions to accomplish the desired angularly displaced positional deposition, and means intermediate the container and the articles at the loading locality for guiding said reciprocating arm into the container.

17. Apparatus for packing articles in a container in successive layers, each layer having a predetermined angular displacement relative to an adjacent layer comprising means for presenting the container at a loading locality, means for presenting the articles at the loading locality including means disposed above the container including a vertical aperture for releasably holding the articles to be packed, means passing through said vertical aperture for inserting the articles into the container at successively higher levels therein comprising, a reciprocating arm positioned to move in a path through said aperture and into said container, variable arresting means disposed in the path of said reciprocating arm to progressively limit the length of stroke thereof on successive reciprocations of said arm, article holding means mounted on said arm, control means responsive to the position of said reciprocating arm during the successive reciprocations thereof for actuating said article holding means to grasp the articles at the loading locality and release the articles at successively higher levels in the container, means for rotating the container intermediate successive article depositions therein to accomplish the desired positional deposition and means intermediate the container and the articles at the loading locality to guide the reciprocating arm into the container.

18. Apparatus for packing articles in a container in successive layers, each layer having a predetermined angular displacement relative to an adjacent layer, comprising a displaceable container supporting platform for successively presenting containers to be filled at a loading locality, a displaceable article supporting platform positioned above said container supporting platform for successively presenting the articles to be packed above the mouth of the container positioned at the loading locality, means for depositing the articles presented at the loading locality in the container positioned at the loading locality, including a reciprocating arm, means mounted on said reciprocating arm to grasp the articles at the loading locality and release the articles at the desired level in said container, and means for rotating the container being filled intermediate successive article depositions therein to effect the desired positional deposition of the articles packed therein.

19. Apparatus as set forth in claim 18 wherein said container supporting platform and article supporting platform are rotationally displaceable.

20. Apparatus for packing articles in a container in successive layers, each layer being rotationally disposed a fraction of a circle from the adjacent layers, comprising a displaceable container supporting platform for successively presenting containers to be filled at a loading locality, a displaceable article supporting platform positioned above said container supporting platform for successively presenting the articles to be packed above the mouth of the container positioned at the loading locality, means for depositing the articles in the container positioned at the loading locality, including a reciprocating arm having a variable length of stroke, control means associated with said arm for decreasing the length of stroke thereof a predetermined amount on each successive reciprocation of the reciprocating arm, clamping members mounted on the lower extremity of the reciprocating arm to grasp the articles at the loading locality and to release the same at the desired level within the container positioned at the loading locality, and means for rotating the container being filled intermediate successive article depositions therein to effect the desired positional deposition of the articles packed therein.

21. The apparatus as set forth in claim 18, including associated means to control the periodicity of the movements of said container and article supporting platforms, said depositing means, and said container rotating means.

22. Apparatus for packing articles in a container, comprising a displaceable container supporting platform for successively presenting containers to be filled at a loading locality, a displaceable article supporting platform positioned above said container supporting platform for successively presenting the articles to be packed above the mouth of the container positioned at the loading locality, releasable article holding means mounted on said article supporting platform for releasably holding the articles disposed above the mouth of said container, cooperating means including a reciprocable arm having a releasable article holding device mounted thereon for removing an article from said article holding means on the downward stroke of said arm and directly advancing the article into the container positioned at the loading locality, means engageable with the article advancing means for arresting the latter upon displacement of the article to a predetermined level in the container, and means carried with the article advancing means and engageable with the arresting means before the latter engages the advancing means, for operating said article holding device to release the article when it reaches said predetermined level.

23. Apparatus for packing articles in a container, comprising a displaceable container supporting platform for successively presenting containers to be filled at a loading locality in an upwardly open position, a displaceable article supporting platform positioned above said container supporting platform for successively presenting the articles to be packed above the mouth of the container positioned at the loading locality, means included in said article supporting platform and having a vertical aperture therein adapted to releasably support the articles, article advancing means positioned to reciprocate in a path extending through said aperture and into said container positioned at the loading locality, said advancing means including an article grasping device adapted to engage said releasably held article at the loading locality on the downward movement of said article advancing means and to hold said engaged article during a portion of its advance into said container, said advancing means moving said article grasping device into operative engagement with the article and to advance the article grasping device together with the engaged article through said aperture into the container.

24. The apparatus set forth in claim 18, including guiding means disposed intermediate said article and container supporting platforms and in the path of said reciprocating arm for directing said arm into the container being filled at the loading locality.

25. In apparatus for packing articles in a container in successive layers, apertured releasable article holding means for positioning the articles to be packed at a loading locality above the mouth of the container, a vertically reciprocable arm positioned to reciprocate in a path through the apertured article holding means, article grasping means mounted on said reciprocating arm, and associated pressure means responsive to the position of said arm during reciprocation thereof for controlling the grasping of said articles by the article grasping means as said means pass through the aperture in said article holding means on the downward movement of said reciprocating arm and for controlling the release of articles at a desired level in a container positioned at the loading locality.

26. Apparatus for packing articles, comprising means for successively presenting containers to be filled at a loading locality, means for presenting releasably held articles to be packed at a predetermined locality directly above the mouth of a container positioned at the loading locality, a releasable article holding device, reciprocating means for advancing said device along a path determined by said container positioned at the loading locality and the releasably held articles positioned directly above the mouth thereof, and means associated with said advancing means and controlled in accordance with the position thereof for actuating said article holding device to engage and hold the article to be packed as the advancing means passes the same on the downward movement thereof and for operating said article holding device to release the article upon arrival of said advancing means at a predetermined level within said container positioned at the loading locality.

*27. A container packing machine of the class described comprising, means for disposing a container in packing position, a reciprocating member mounted to enter and be retracted from said container, means on said member for holding an article to be placed in said container, means for releasing an article from said holding means when the article is placed in said container, means for altering the position of the holding means upon each entry to place said articles in the container in predetermined array, and means for delivering articles to be*

*engaged by said holding means when said reciprocating member is positioned externally of said container.*

References Cited in the file of this patent or the original patent

UNITED STATES PATENTS

| | | |
|---|---|---|
| 952,352 | Pieper | Mar. 15, 1910 |
| 1,643,367 | Bergmann et al. | Sept. 27, 1927 |
| 1,904,720 | Douglass | Apr. 18, 1933 |
| 2,253,283 | Minaker | Aug. 19, 1941 |
| 2,280,854 | Rooney | Apr. 28, 1942 |
| 2,332,058 | Cottonar et al. | Oct. 19, 1943 |
| 2,358,447 | Creamer | Sept. 19, 1944 |
| 2,371,027 | Cottonar et al. | Mar. 6, 1945 |
| 2,466,693 | Fischer | Apr. 12, 1949 |
| 2,470,795 | Socke | May 24, 1949 |
| 2,524,846 | Socke et al. | Oct. 10, 1950 |
| 2,540,612 | Fischer et al. | Feb. 6, 1951 |
| 2,546,501 | Hamilton | Mar. 27, 1951 |
| 2,675,153 | Weimer | Apr. 13, 1954 |